US009984281B2

(12) United States Patent
Tomita et al.

(10) Patent No.: US 9,984,281 B2
(45) Date of Patent: May 29, 2018

(54) IMAGE PROCESSING APPARATUS, STYLUS, AND IMAGE PROCESSING METHOD

(71) Applicant: PANASONIC INTELLECTUAL PROPERTY MANAGEMENT CO., LTD., Osaka (JP)

(72) Inventors: Hiroto Tomita, Fukuoka (JP); Tsuyoshi Nakamura, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 59 days.

(21) Appl. No.: 15/003,183

(22) Filed: Jan. 21, 2016

(65) Prior Publication Data

US 2016/0224825 A1   Aug. 4, 2016

(30) Foreign Application Priority Data

Jan. 29, 2015  (JP) ................................ 2015-015361
Jan. 29, 2015  (JP) ................................ 2015-015363

(51) Int. Cl.
*G06K 9/46* (2006.01)
*G06K 9/00* (2006.01)
(Continued)

(52) U.S. Cl.
CPC ..... *G06K 9/00268* (2013.01); *G06F 3/04845* (2013.01); *G06F 3/04883* (2013.01);
(Continued)

(58) Field of Classification Search
None
See application file for complete search history.

(56) References Cited

U.S. PATENT DOCUMENTS 9,329,776 B2 * 5/2016 Amano ............... G06F 3/04886
2010/0170052 A1   7/2010 Ortins et al.
(Continued)

FOREIGN PATENT DOCUMENTS

CA      2744080       5/2010
CN    102215922      10/2011
(Continued)

OTHER PUBLICATIONS

International Search Report of PCT application No. PCT/JP2016/000234 dated Mar. 8, 2016.

*Primary Examiner* — Andrae S Allison
(74) *Attorney, Agent, or Firm* — Greenblum & Bernstein, P.L.C.

(57) ABSTRACT

An image processing apparatus includes: an imaging unit that images a video; a display unit that displays the imaged video on a screen; a face-position acquirer that acquires a position of a face included in the video on the screen; an operation receiver that receives a touch operation on the screen; and a make-up-image composer that composes a make-up image with a part of the face in the video. The make-up-image composer changes a composition state of the make-up image on condition that a swipe operation is performed in a direction oriented to the position of the face. The image processing apparatus further includes a stylus detector that detects a portion of a predetermined marker color as a stylus from the video when the portion of the predetermined marker color is included in the video.

25 Claims, 24 Drawing Sheets

(51) Int. Cl.
*G06T 11/60* (2006.01)
*G06F 3/0488* (2013.01)
*G06F 3/0484* (2013.01)

(52) U.S. Cl.
CPC ..... *G06K 9/00261* (2013.01); *G06K 9/00281* (2013.01); *G06T 11/60* (2013.01)

(56) References Cited

U.S. PATENT DOCUMENTS

| | | | | |
|---|---|---|---|---|
| 2012/0162242 | A1* | 6/2012 | Amano | G06F 3/04886 345/592 |
| 2014/0016823 | A1* | 1/2014 | Ye | G06T 19/20 382/103 |
| 2014/0071251 | A1 | 3/2014 | Nakamura et al. | |
| 2015/0145882 | A1* | 5/2015 | Nguyen | H04N 1/622 345/589 |

FOREIGN PATENT DOCUMENTS

| | | |
|---|---|---|
| CN | 104380339 | 2/2015 |
| JP | 2005-92588 | 4/2005 |
| JP | 2006-350967 | 12/2006 |
| JP | 2012-509508 | 4/2012 |
| WO | 2010/059484 | 5/2010 |
| WO | 2013/140776 | 9/2013 |
| WO | 2014/167831 | 10/2014 |

\* cited by examiner

FIG. 3

| | ZEROTH MAKE-UP PATTERN | FIRST MAKE-UP PATTERN | SECOND MAKE-UP PATTERN | THIRD MAKE-UP PATTERN |
|---|---|---|---|---|
| FIRST MAKE-UP DEPTH | — | M11 | M12 | M13 |
| SECOND MAKE-UP DEPTH | — | M21 | M22 | M23 |
| THIRD MAKE-UP DEPTH | — | M31 | M32 | M33 |

| TRACKING IDENTIFIER | MAKE-UP SETTING | CURRENT POSITION | SWIPE START POSITION | RELATIVE POSITION | TRACKING STATE |
|---|---|---|---|---|---|
| I1 | M13 | PP1 | PS1 | TO I3(x1,y1) | CONTINUING |
| I2 | M21 | — | — | TO I1(x2,y2) | END |
| I3 | — | PP3 | PS3 | TO I1(x3,y3) | START |
| ... | ... | ... | ... | ... | ... |

321　322　323　324　325　326

FIG. 7
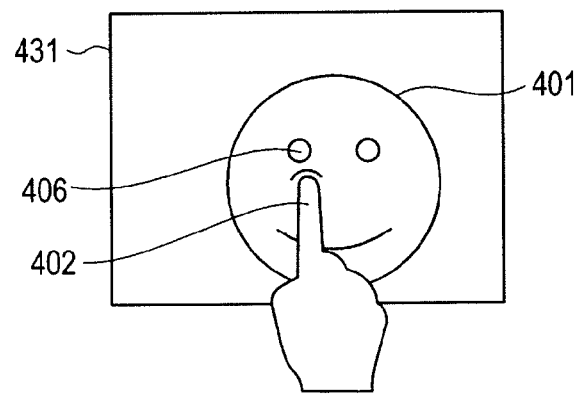
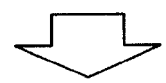
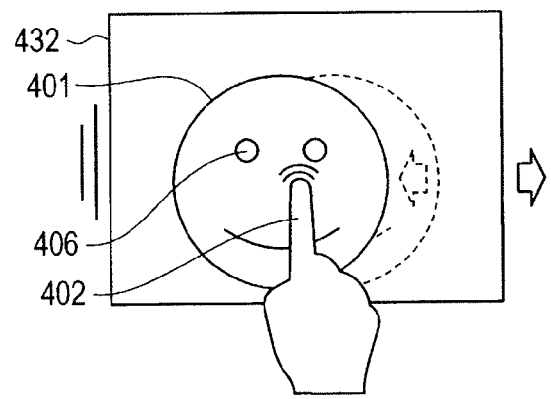
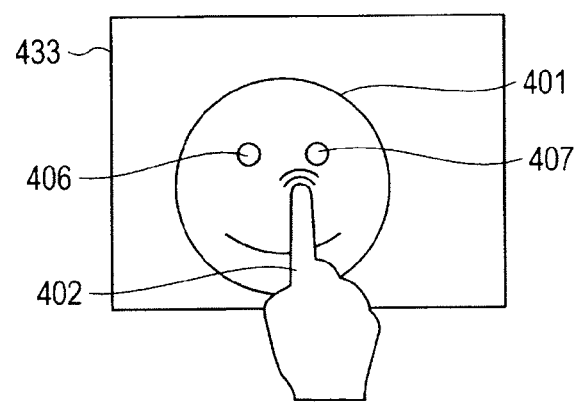

FIG. 15

| MARKER COLOR | MAKE-UP REGION | MAKE-UP COLOR | MAKE-UP DEPTH |
|---|---|---|---|
| RED | LIP | RED | TRANSPARENCY 90% |
| ORANGE | LIP | CORAL ORANGE | TRANSPARENCY 30% |
| PINK | CHEEKBONE | PINK | TRANSPARENCY 30% |
| LIGHT BLUE | EYELID | BLUE GRAY | TRANSPARENCY 60% |
| . . . | . . . | . . . | . . . |

FIG. 19
510a
| 511a | 512 | 513 | 514 |
|---|---|---|---|
| MARKER COLOR (COLOR DISPOSITION PATTERN) | MAKE-UP REGION | MAKE-UP COLOR | MAKE-UP DEPTH |
|  | LIP | RED | TRANSPARENCY 90% |
|  | LIP | CORAL ORANGE | TRANSPARENCY 85% |
|  | LIP | SHOCKING PINK | TRANSPARENCY 85% |
|  | EYELID | SHOCKING PINK | TRANSPARENCY 85% |
| ⋮ | ⋮ | ⋮ | ⋮ |

IMAGE PROCESSING APPARATUS, STYLUS, AND IMAGE PROCESSING METHOD

BACKGROUND OF THE INVENTION

1. Field of the Invention

The present disclosure relates to an image processing apparatus, a stylus, and an image processing method, and more particularly, to an image processing apparatus, a stylus, and an image processing method capable of composing a make-up image with a face-imaged video.

2. Description of the Related Art

There are technologies for virtual make-up in which make-up is virtually performed by composing make-up images of lipsticks or blushers (cheeks) on images obtained by imaging faces (for example, see Japanese Patent Unexamined Publication No. 2005-92588). In the technology disclosed in Japanese Patent Unexamined Publication No. 2005-92588, an image obtained by imaging a face and an operation region for receiving designation of make-up content are displayed on a touch panel screen. Then, in the technology disclosed in Japanese Patent Unexamined Publication No. 2005-92588, a make-up image is composed with the image obtained by imaging the face based on a touch pen operation on the screen. According to the technology disclosed in Japanese Patent Unexamined Publication No. 2005-92588, a face state at the time of performing make-up can be simulated and displayed. Through this technology, it is possible to generate and display an image of a face when make-up is performed even when make-up is not actually performed on the face.

Incidentally, recently actions (self imaging) of imaging users as subjects using smartphones or the like by himself or herself are in fashion. Most of the self-captured images are captured in order to supply the images to friends or the like so that the friends or the like browse the images in social media. Many users perform facial treatments on the self-captured images so the faces of the users look beautiful. As one of the facial treatments, there is virtual make-up and a make-up effect can be given.

It is well known that children imitate adults and play make-up. Some children obtains faces on which make-up is performed and also feels pleasure to imitate make-up operations of adults by sliding lipsticks on their lips. Accordingly, it is desirable to realize virtual make-up by make-up operations (gestures), for example, by composing make-up images of lipsticks with face images when operations of putting on the lipsticks are imitated.

A technology for simply deciding a face region which is an image processing target in an image is disclosed in, for example, Japanese Patent Unexamined Publication No. 2006-350967. In the technology disclosed in Japanese Patent Unexamined Publication No. 2006-350967, a face region is acquired on a screen by displaying an image on the screen and performing a face recognition process on an image. In the technology disclosed in Japanese Patent Unexamined Publication No. 2006-350967, when a touch operation on a screen is received and a position at which the touch operation is performed is included in an acquired face region, the face region is set as an image processing target.

By adopting the technology disclosed in Japanese Patent Unexamined Publication No. 2005-92588, a user can simply select a target on which a virtual make-up is performed. However, it takes effort and time to search for and select an image which is a virtual make-up target among a plurality of self captured-images after imaging. Accordingly, virtual make-up is considered to be performed on a face shown on an imaged video during the imaging.

However, self-imaging is normally performed while confirming the appearance of a face on a video of a screen. Therefore, when a face is selected, a finger may become an interference. Accordingly, a technology for enabling a virtual make-up operation to be performed while performing self-imaging is desirable.

The present disclosure is to provide a technology for enabling a virtual make-up operation to be performed while performing self-imaging.

SUMMARY OF THE INVENTION

According to the present disclosure, there is provided an image processing apparatus including: an imaging unit that images a video; a display unit that displays the imaged video on a screen; a face-position acquirer that acquires a position of a face included in the video on the screen; an operation receiver that receives an operation on the screen; and a make-up-image composer that composes a make-up image with a part of the face of the video.

The image processing apparatus according to the present disclosure may further include a make-up-image composer that composes a make-up image with a part of the face of the video. The make-up-image composer may change a composition state of the make-up image on condition that a swipe operation is performed in a direction oriented to the position of the face.

The image processing apparatus according to the present disclosure may further include: a stylus detector that detects a portion of a predetermined marker color as a stylus from the video when the portion of the predetermined marker color is included in the video; and a make-up-image composer that composes a make-up image associated in advance with the predetermined marker color with a part of the face of the video on condition that the stylus is detected.

A stylus used in the image processing apparatus according to the present disclosure is a bar-shaped member. The predetermined marker color is applied to a region including a front end portion of the bar-shaped member.

According to the present disclosure, there is provided an image processing method including: imaging a video; displaying the imaged video on a screen; acquiring a position of a face included in the video on the screen; and receiving an operation on the screen.

In the image processing method according to the present disclosure, the operation on the screen may be a touch operation. The image processing method may further include composing a make-up image with a part of the face in the video on condition that a swipe operation is performed in a direction oriented to a position of the face.

The image processing method according to the present disclosure may further include: detecting a portion of a predetermined marker color as a stylus from the video when the portion of the predetermined marker color is included in the video; and composing a make-up image associated in advance with the predetermined marker color with a part of the face of the video on condition that the stylus is detected.

According to the present disclosure, a virtual make-up operation is enabled while performing self-imaging.

BRIEF DESCRIPTION OF DRAWINGS

FIG. 3 is a diagram illustrating an example of content of make-up image information according to the first exemplary embodiment;

FIG. 4 is a diagram illustrating an example of content of a state recording table according to the first exemplary embodiment;

FIG. 7 is a diagram illustrating an example of a way of deciding a face part which is a touch operation target according to the first exemplary embodiment;

FIG. 15 is a diagram illustrating an example of content of a make-up image table according to the second exemplary embodiment;

FIG. 19 is a diagram illustrating an example of content of a make-up image table according to Modification Example 1 of the second exemplary embodiment;

DETAILED DESCRIPTION OF THE PREFERRED EMBODIMENTS

First Exemplary Embodiment

Hereinafter, a first exemplary embodiment of the present disclosure will be described in detail with reference to the drawings.

Use Shape of Apparatus

First, a use way for an image processing apparatus according to the first exemplary embodiment will be described.

Figure 1:
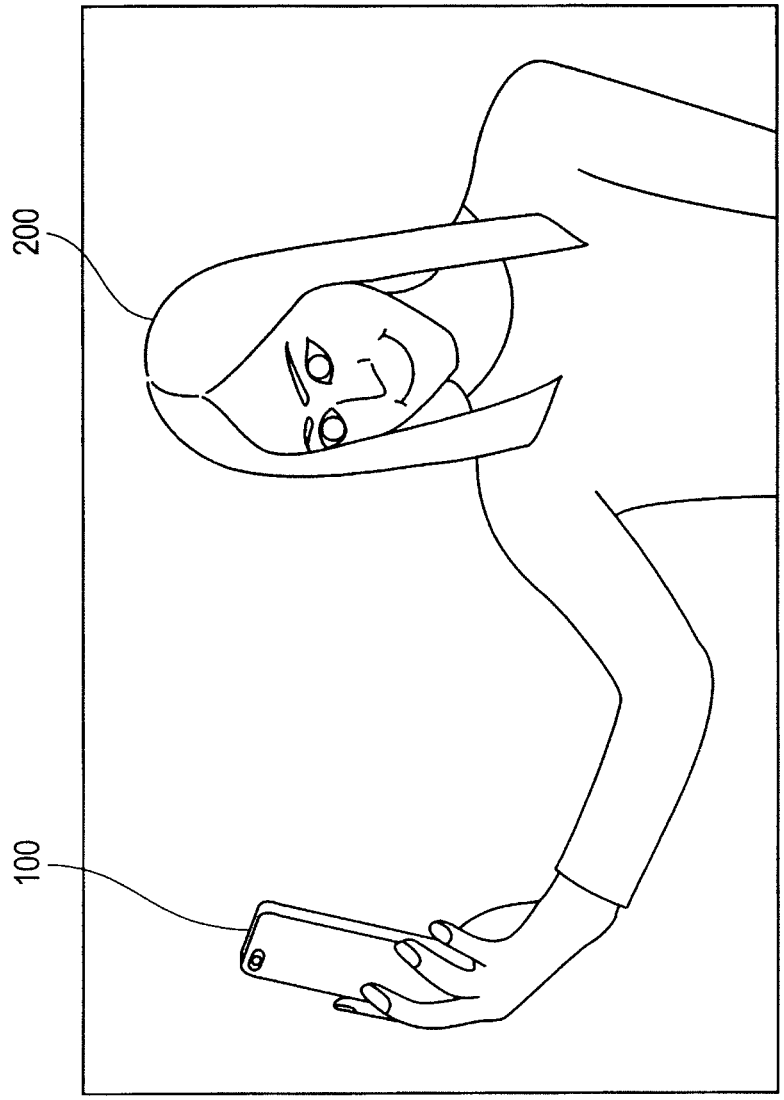
FIG. 1 is a diagram illustrating an example of a use way for an image processing apparatus according to a first exemplary embodiment.

FIG. 1 is a diagram illustrating an example of the use way for an image processing apparatus according to the first exemplary embodiment.

As illustrated in FIG. 1, image processing apparatus 100 is, for example, a smartphone. Image processing apparatus 100 includes a liquid crystal display to which a touch panel is attached and includes an internal camera and an imaging button (neither of which is illustrated) disposed on the same surface side as the display. The imaging button may be a button image displayed on the display.

Image processing apparatus 100 reverses a video captured with the inside camera in right and left directions and displays the video on the display in substantial real time. Then, image processing apparatus 100 cuts out and records a still image from the video during display at a pressing timing of the imaging button or starts recording a video.

For example, user 200 presses the imaging button at a desired timing while orienting the inside camera to her face and confirming the appearance of her face with the video shown on the display. This is an action called so-called self-imaging.

Image processing apparatus 100 further composes a make-up image with a portion of the face of the video through image processing in response to a touch operation on a touch panel of the user. At this time, as described above, it is not desirable that the visibility of the face of user 200 shown on the display deteriorates due to her finger.

Accordingly, image processing apparatus 100 acquires the position of the face on the screen of the video shown on the display. Then, image processing apparatus 100 changes a composition state of the make-up image, for example, by composing the make-up image or changing content of the composed make-up image on condition that a swipe operation is performed in a direction oriented to the position of the face.

Here, the swipe operation is an operation of touching a front portion of a finger, a stylus, or the like on a screen and sliding the front portion in the touch state. The direction oriented to the position of the face is, for example, a direction in which the region of the face is present on its extension or a direction of the swipe operation in which a distance between a representative position (for example, a central position) of a touch region of the fingertip and a representative position (for example, a central position) of the face decreases.

That is, image processing apparatus 100 enables user 200 to perform an operation of changing a composition state of a make-up image so that a region in which her face is shown is not screened by her finger.

Configuration of Apparatus

Next, the configuration of image processing apparatus 100 will be described.

Figure 2:
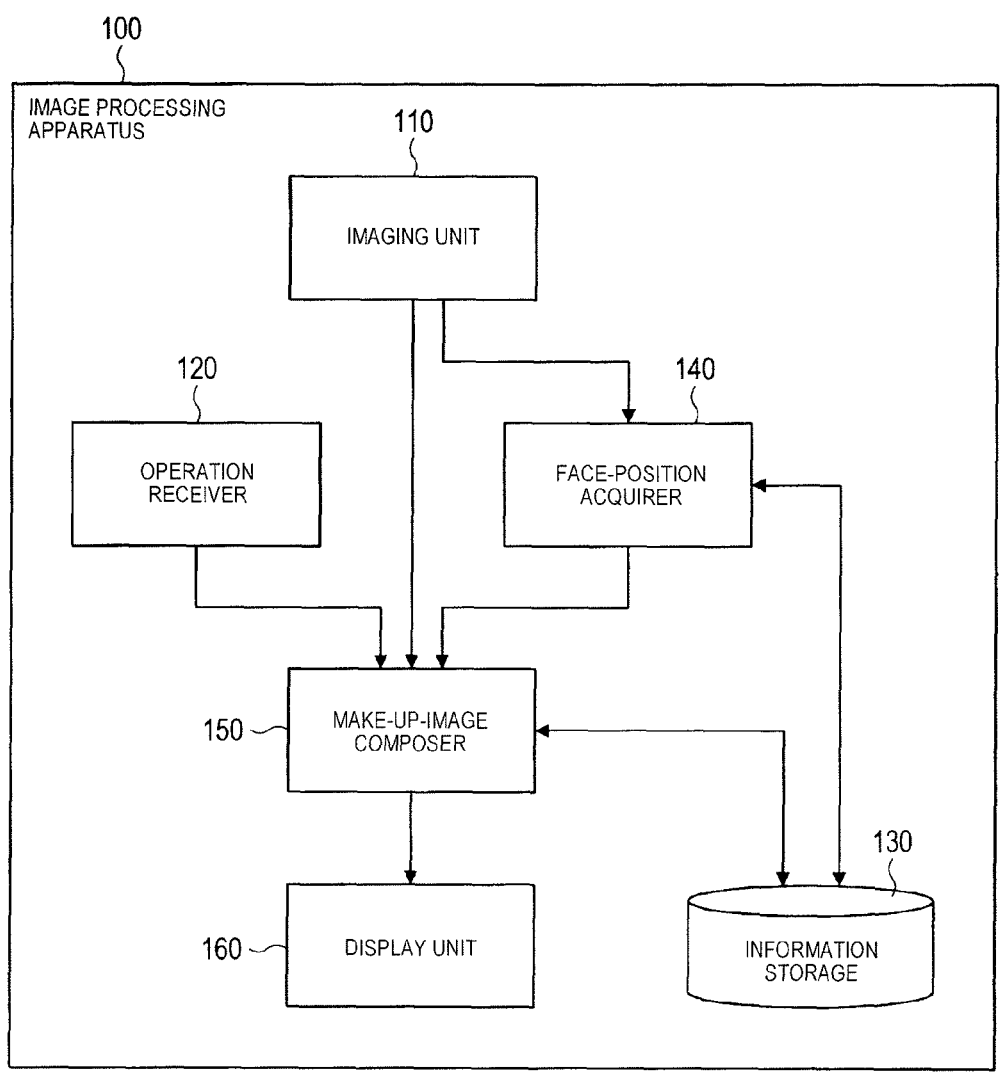
FIG. 2 is a block diagram illustrating an example of the configuration of the image processing apparatus according to the first exemplary embodiment.

FIG. 2 is a block diagram illustrating an example of the configuration of image processing apparatus 100.

In FIG. 2, image processing apparatus 100 includes imaging unit 110, operation receiver 120, information storage 130, face-position acquirer 140, make-up-image composer 150, and display unit 160.

Imaging unit 110 includes, for example, the above-described internal camera (digital still camera) and images a video. When self-imaging is performed, imaging unit 110 images the user or a video of faces of a plurality of people including the user. Then, imaging unit 110 horizontally reverses the imaged video in the right and left directions and outputs the video to face-position acquirer 140 and make-up-image composer 150.

Operation receiver 120 includes, for example, the above-described touch panel and receives a touch operation on a screen of a liquid crystal display included in display unit 160 to be described below. Then, operation receiver 120 detects whether a finger is touched on a certain portion of the screen at a predetermined period and outputs coordinate information indicating a detection result to make-up-image composer 150. That is, time-series data of the coordinate information is operation information indicating content of the performed touch operation.

Information storage 130 in advance stores face feature information for detecting people faces or face parts included in an image from the image and make-up image information for generating make-up images and composing the make-up images with parts of the faces of a video. Information storage 130 stores a state recording table for managing each face state detected from the video.

The face feature information is, for example, information indicating image features such as the shapes of face parts of eyes, lips, or the like generated by learning based on a plurality of face image samples or image features of entire faces such as dispositions of the face parts or face color histograms generated by the learning. The face parts include face feature points such as the corners of eyes and angles of mouths.

The make-up image information is information describing content of a make-up image to be composed with a face (hereinafter referred to as "make-up image data") for each of the combinations of a plurality of make-up patterns and a plurality of make-up depths.

FIG. 3 is a diagram illustrating an example of content of the make-up image information.

As illustrated in FIG. 3, for the plurality of make-up patterns 311 and the plurality of make-up depths 312, make-up image information 310 describes make-up image data 313 for each combination of make-up pattern 311 and make-up depth 312.

Make-up image data 313 regulates, for example, a make-up application region, a make-up color, and a density (transparency of a make-up image) of the make-up color indicated by a make-up image, using the positions of feature points of a face, such as angles of mouth, as references. The make-up application region is defined by, for example, coordinate values or functions in a space in which the positions of face feature points are set as references. The make-up color is defined by, for example, coordinate values in a predetermined color space such as RGB (Red, Green, and Blue) or HSV (Hue, Saturation, Value). The make-up depth is defined by, for example, a coefficient for a pixel value when a make-up image is composed with a captured image by a blend.

Here, a state in which a make-up image is not composed is set as a zeroth make-up pattern. Further, first to third make-up patterns differ in at least one of the make-up application region, the make-up color, and the make-up color density. The make-up pattern includes, for example, a make-up pattern giving a pretty impression or a make-up pattern giving a gorgeous impression. For first to third make-up depths 312, the density of a color of a make-up image is denser in this order (transparency of the make-up image is higher).

A difference in the make-up application region may be a difference meaning whether a blusher application region is large or small or may be difference meaning a part of make-up application among a plurality of parts for lipsticks or blushers. A change in the density of a make-up color may differ among the parts.

The state recording table is a table which is appropriately generated and updated by face-position acquirer 140 and make-up-image composer 150 to be described below and is a table in which a face state tracked by face-position acquirer 140 is recorded.

FIG. 4 is a diagram illustrating an example of content of the state recording table.

As illustrated in FIG. 4, state recording table 320 records tracking identifier 321, make-up setting 322, current position 323, swipe start position 324, relative position 325, and tracking state 326.

Tracking identifier 321 is a target identifier tracked as the same face by face-position acquirer 140 to be described below. Make-up setting 322 is make-up image data currently set in a face indicated by tracking identifier 321. Current position 323 is the position of the face indicated by tracking identifier 321 on a current screen. The position on the screen is expressed by, for example, coordinate values of the XY coordinate system set in advance on the screen.

Swipe start position 324 is a position of the face indicated by tracking identifier 321 on the screen when a swipe operation recently starts. Relative position 325 is a relative position to another face. Tracking state 326 is information indicating whether the tracking of the position of the face is continuing, ends, or starts immediately before.

Relative position 325 is preferably a relative position relation in which a predetermined direction including at least the vertical direction in the real world is set as a reference. In this case, image processing apparatus 100 necessarily includes an acceleration sensor. For relative position 325, a direction in the real world may not necessarily be acquired and a relative position of another face to a face may be determined using disposition on a screen of a plurality of face parts of the continuously tracked face as a reference.

Face-position acquirer 140 in FIG. 2 acquires information regarding the positions of faces on a screen included in the video and the positions (the positions of face feature points) of face parts in the faces from the input video in order.

More specifically, face-position acquirer 140 first performs face detection on the input video and obtains positional information regarding a face in an image frame. Next, face-position acquirer 140 detects the position of a face part based on the obtained positional information regarding the face and obtains positional information regarding the face part. For the detection of the face and the detection of the face part, a known technology can be adopted. Then, face-position acquirer 140 converts the position of the extracted face on the video into a position on a screen based on a pre-decided positional relation between the video and the screen on which the video is shown.

Face-position acquirer 140 tracks a position for each face in the video. For example, face-position acquirer 140 determines that the face is the same when a difference in the position of the face detected in a plurality of temporally continuous image frames among a plurality of time-series image frames included in the video is within a predetermined range. Face-position acquirer 140 tracks the position of the face by performing the determination continuously along the time axis of the video.

Then, face-position acquirer 140 adds tracking identifier 321 to state recording table 320 whenever face tracking starts, updates tracking state 326 when the face tracking starts, and updates current position 323 during the face tracking. The face tracking is performed to detect a face detected in an immediately previous image frame even in the periphery of a position detected in the immediately previous image frame among recent image frames. Further, face-position acquirer 140 updates tracking state 326 in state recording table 320 whenever the face tracking ends (see FIG. 4).

Face-position acquirer 140 acquires a relative position of each face to another face on a screen when a plurality of faces are included in each screen. Face-position acquirer 140 updates relative position 325 of state recording table 320 at the acquired relative position whenever the relative position is acquired. Relative position 325 of the face for which the tracking ends remains unchanged.

Face-position acquirer 140 outputs face position information indicating the position of a face and the position of a face part (hereinafter appropriately referred to as a "face position") on the acquired screen to make-up-image composer 150.

Make-up-image composer 150 composes the make-up image with a part of the face of the input video based on the input operation information (the time-series data of the coordinate information regarding a region in which the touch operation is performed) and the face position information. More specifically, make-up-image composer 150 determines whether a swipe operation is performed in the direction oriented to the position of the face based on the operation information and changes the composition state of the make-up image on condition that the swipe operation is performed. At this time, make-up-image composer 150 updates swipe start position 324 in state recording table 320. Make-up-image composer 150 composes the image using a known image combination technology such as a blend.

Then, make-up-image composer 150 outputs the video on which the make-up image is appropriately composed to display unit 160.

Make-up-image composer 150 does not compose the make-up image with the part of the face in an initial state. Make-up-image composer 150 starts composing the make-up image on condition that a swipe operation (hereinafter referred to as a "face direction swipe operation") is performed in a direction oriented to the position of the face with which the make-up image is not composed. Make-up-image composer 150 may determine that a swipe operation in which a start position is included in the region of the face or a region further enlarged from the region of the face is not the face direction swipe operation.

Make-up-image composer 150 changes the make-up depth indicated by the make-up image composed on the condition that the face direction swipe operation is performed on the face composed with the make-up image in a direction (first direction) other than the up and down directions. Make-up-image composer 150 changes a make-up pattern indicated by the make-up image composed on the condition that the swipe operation is performed on the face composed with the make-up image in the up and down directions (second direction).

Make-up-image composer 150 decides a touch operation target using the position of the face at the time of start of a touch operation as a reference.

Make-up-image composer 150 acquires the relative position relation among the plurality of faces when the plurality of faces are included in the screen, and determines whether make-up setting is maintained for each face based on whether the tracking of the position continues and the relative position relation is maintained.

The change in the composition state of the make-up image, the details of the decision of the touch operation target, and the determination of the maintenance of the make-up setting will be described below.

Display unit 160 includes, for example, the foregoing liquid crystal display and displays the input video with which the make-up image is appropriately composed (hereinafter referred to as a "virtual make-up image") on the screen of the liquid crystal display.

Although not illustrated, image processing apparatus 100 further includes the above-described imaging button and an information recorder. The information recorder cuts out a still image from the virtual make-up video at a timing at which the imaging button is pressed and records the still image or starts recording the virtual make-up video.

Although not illustrated, image processing apparatus 100 includes, for example, a central processing unit (CPU), a storage medium such as a read-only memory (ROM) storing a control program, and a working memory such as a random access memory (RAM). In this case, the function of each of the foregoing units is realized when the CPU executes the control program.

Image processing apparatus 100 having such a configuration can change the composition state of the make-up image on the face included in the video on the condition that the face direction swipe operation is performed on the screen.

Change in Composition State of Make-up Image

Here, the way of changing the composition state of the make-up image by make-up-image composer 150 will be described.

Figure 5:
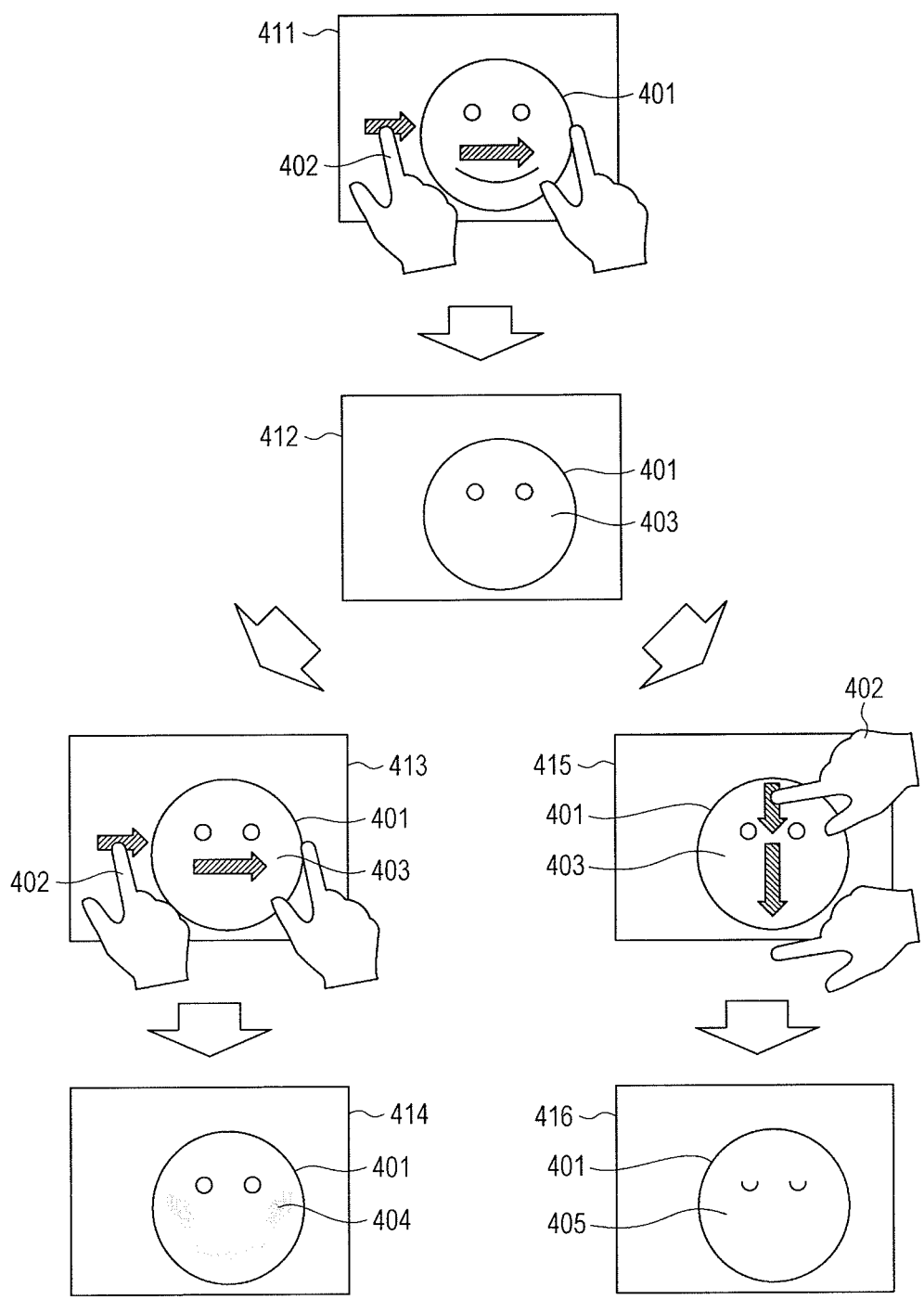
FIG. 5 is a diagram illustrating an example of a way of changing a composition state of a make-up image according to the first exemplary embodiment.

FIG. 5 is a diagram illustrating an example of the way of changing the composition state of the make-up image.

As illustrated in first screen state 411 in FIG. 5, the face direction swipe operation is performed with finger 402 of the user on a screen of a state (initial state) in which the make-up image is not composed with face 401.

Then, make-up-image composer 150 composes make-up image 403 with face 401, as illustrated in second screen state 412 in FIG. 5. This corresponds to a change in make-up image data 313 to be applied from make-up image data 313 (with no make-up image) of the zeroth make-up pattern to make-up image data 313 of a combination of the first make-up pattern and first make-up depth 312 (see FIG. 3).

Then, as illustrated in third screen state 413 in FIG. 5, the face direction swipe operation is further performed on face 401 on which make-up image 403 is composed in a direction other than the up and down directions.

Then, make-up-image composer 150 switches composed make-up image 403 to make-up image 404 denser than make-up image 403, as illustrated in fourth screen state 414 in FIG. 5. This corresponds to sequential switch among make-up image data 313 to be applied among first to third make-up depths 312 using make-up setting 322 of state recording table 320 (see FIG. 3).

Alternatively, as illustrated in fifth screen state 415 in FIG. 5, the swipe operation is further performed in at least one direction of the up direction and the down direction on face 401 on which make-up image 403 is composed.

Then, make-up-image composer 150 switches composed make-up image 403 to make-up image 405 with a different make-up pattern from make-up image 403. This corresponds to sequential switch among make-up image data 313 to be applied among the zeroth to third make-up patterns 311 using make-up setting 322 of state recording table 320 (see FIG. 3).

In this way, make-up-image composer 150 changes the composition state of the make-up image according to the touch operation on the screen.

Decision of Touch Operation Target

Next, a way of deciding a touch operation target by make-up-image composer 150 will be described.

Figure 6:
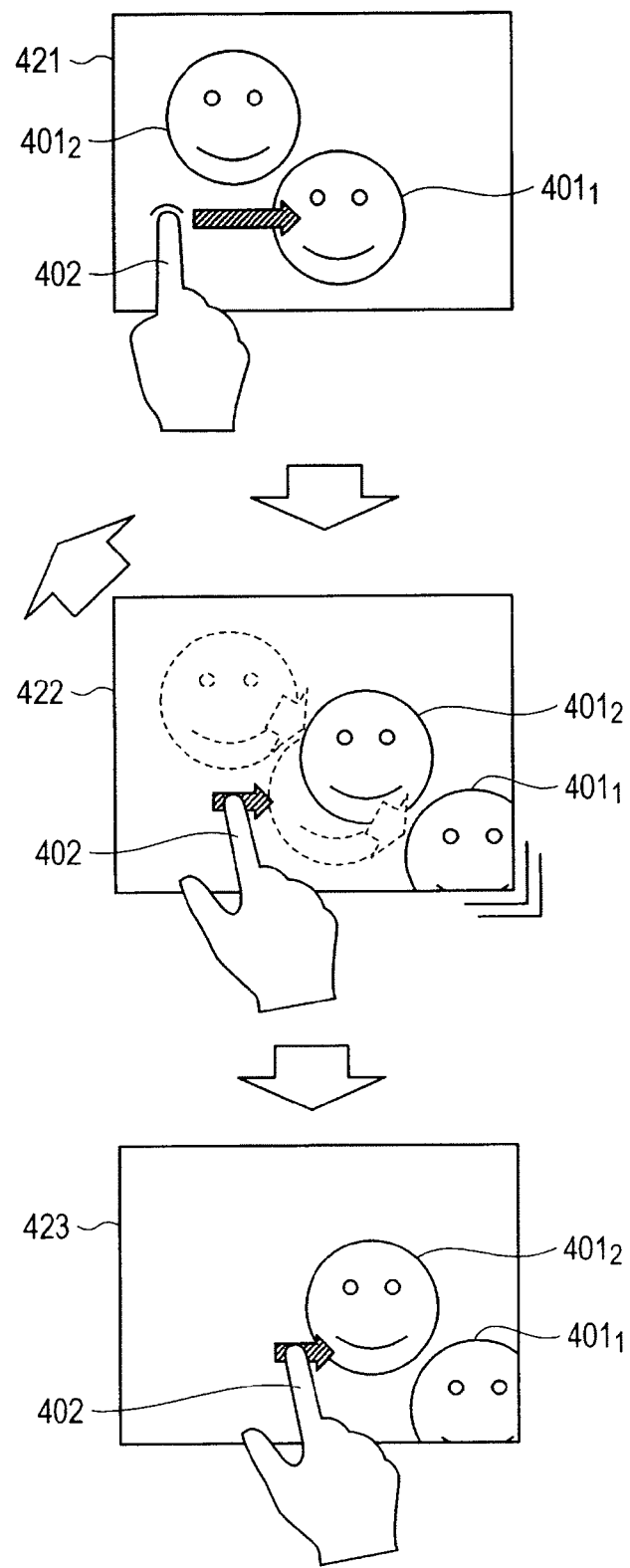
FIG. 6 is a diagram illustrating an example of a way of deciding a face which is a touch operation target according to the first exemplary embodiment.

FIG. 6 is a diagram illustrating an example of the way of deciding a face which is a touch operation target.

As illustrated in first screen state 421 in FIG. 6, on a screen including first face $401_1$ and second face $401_2$, a swipe operation is started with finger 402 of the user in a direction oriented to first face $401_1$.

However, as illustrated in second screen state 422 in FIG. 6, the positions of first face $401_1$ and second face $401_2$ on the screen are changed due to shift or the like of the direction of image processing apparatus 100 during the swipe operation. As a result, as illustrated in third screen state 423 in FIG. 6, not first face $401_1$ but second face $401_2$ is located in a swipe direction of the swipe operation.

When the change in the screen is fast, it is difficult to accurately change the swipe direction on the way in accordance with the change. Accordingly, make-up-image composer 150 determines whether the swipe operation is performed in the direction oriented to the direction to the position of any face 401 using the position of face 401 at the time of the start of the swipe operation as a reference. That is, the position of face 401 at the time of the start of the swipe operation is the position of either first face $401_1$ or second face $401_2$ in first screen state 421. In this example, make-up-image composer 150 determines first face $401_1$ as a swipe operation target.

FIG. 7 is a diagram illustrating an example of a way of deciding a face part which is a touch operation target.

Here, a case in which make-up-image composer 150 changes the color, the shape, the depth of a make-up image for a face part according to a flick direction on the condition that the flick operation is performed on the face part will be described as an example. The flick operation is an operation of touching the tip of a finger, a stylus, or the like in a long shape on one portion of a screen and quickly sliding the tip of the finger, the stylus, or the like in the touch state immediately after the touch.

As illustrated in first screen state 431 in FIG. 7, finger 402 of the user starts the flicking operation on right eye 406 of face 401. However, as illustrated in second screen state 432 in FIG. 7, the position of face 401 on the screen is changed due to shift or the like of the direction of image processing apparatus 100 during the flick operation. As a result, as illustrated in third screen state 433 in FIG. 7, not right eye 406 but left eye 407 is located at the position at which the flick operation is performed.

When the change in the screen is fast, it is difficult to accurately change the flick position on the way in accordance with the change. Accordingly, make-up-image composer 150 determines the position of face 401 at the time of the start of the flick operation, that is, the flick operation target using face 401 in first screen state 431 as a reference. In this example, make-up-image composer 150 determines not left eye 407 but right eye 406 as the flick operation target.

In this way, make-up-image composer 150 decides a target of a touch operation such as the swipe operation or the flick operation using the position of the face (face part) at the time of the start of the touch operation on the screen as a reference.

Determination of Maintenance of Make-up Setting

Next, a way of determining maintenance of the make-up setting by make-up-image composer 150 will be described.

Figure 8:
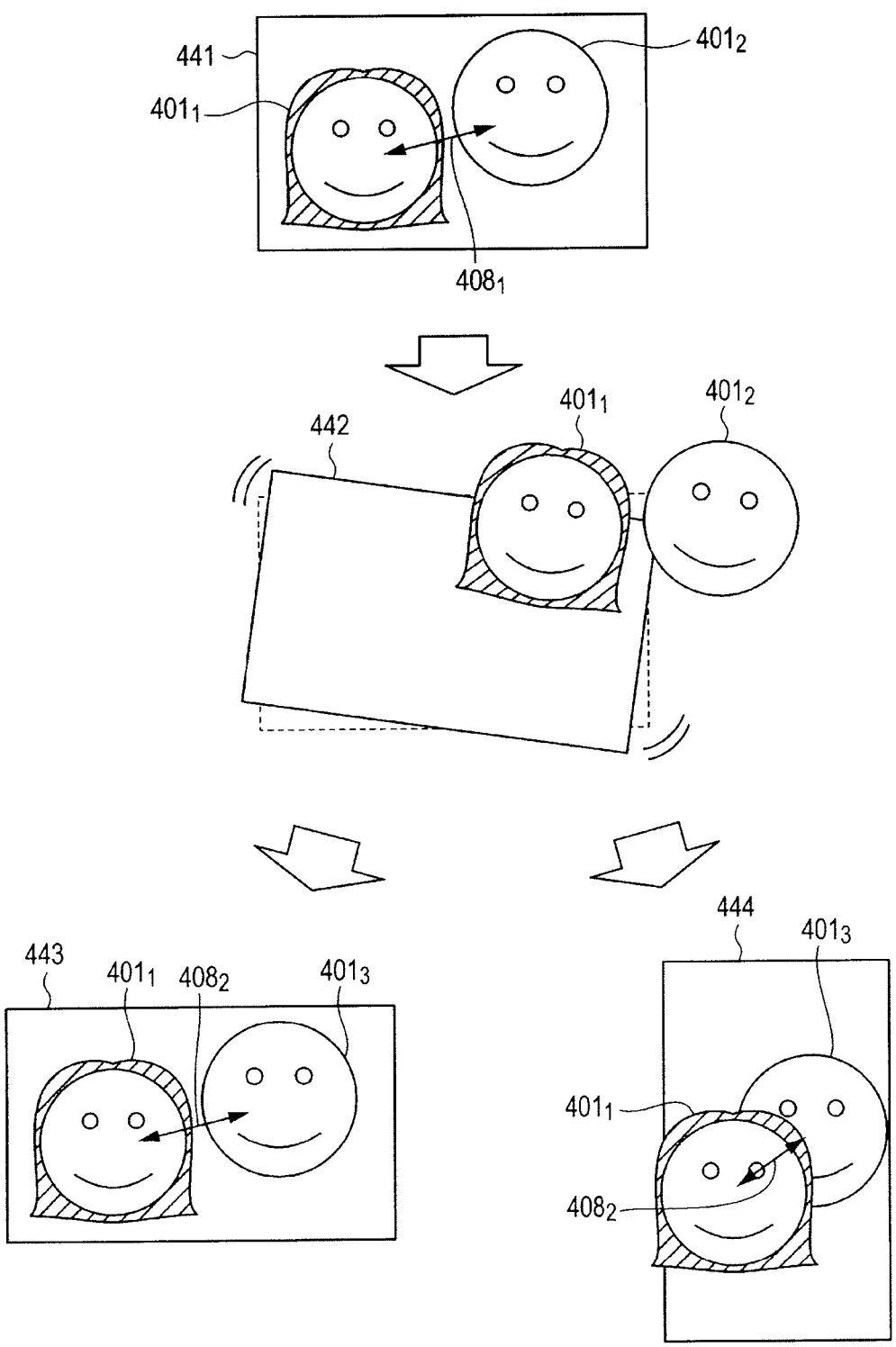
FIG. 8 is a diagram illustrating an example of a way of determining maintenance of make-up setting according to the first exemplary embodiment.

FIG. 8 is a diagram illustrating an example of the way of determining maintenance of the make-up setting.

As illustrated in first screen state 441 in FIG. 8, first face $401_1$ and second face $401_2$ are included in a screen.

However, as illustrated in second screen state 442 in FIG. 8, second face $401_2$ is deviated from the screen due to shift or the like of the direction of image processing apparatus 100 during a touch operation. As illustrated in third screen state 443 and fourth screen state 444 in FIG. 8, third face $401_3$ returns to the screen, for example, when the direction of image processing apparatus 100 is corrected by the user.

Since third face $401_3$ is the face of the same person as second face $401_2$, the make-up setting of second face $401_2$ has to be applied to third face $401_3$ without change. However, when a face identifying process is performed to determine whether third face $401_3$ is the same as second face $401_2$, the processing load may increase.

Accordingly, make-up-image composer 150 first confirms that the tracking of the position of first face $401_1$ continues. Then, make-up-image composer 150 determines whether relative position $408_2$ of third face $401_3$ to first face $401_1$ is identical to relative position $408_1$ of second face $401_2$ to first face $401_1$, using first face $401_1$ for which the tracking of the position continues as a reference. When relative positions

408₁ and 408₂ are identical to each other, make-up-image composer 150 applies the make-up setting of second face 401₂ to third face 401₃.

The fact that the relative positions are identical to each other, as described herein, includes a case in which a difference between the relative positions is within a predetermined range even when the difference occurs.

In this way, when the number of faces included in the screen is changed, make-up-image composer 150 determines whether the make-up setting of the face disappearing from the screen is applied to the face appearing on the screen based on whether the relative position relation of the face is maintained using the face for which the tracking of the position continues as a reference.

Operation of Apparatus

Next, an operation of image processing apparatus 100 will be described.

Figure 9:
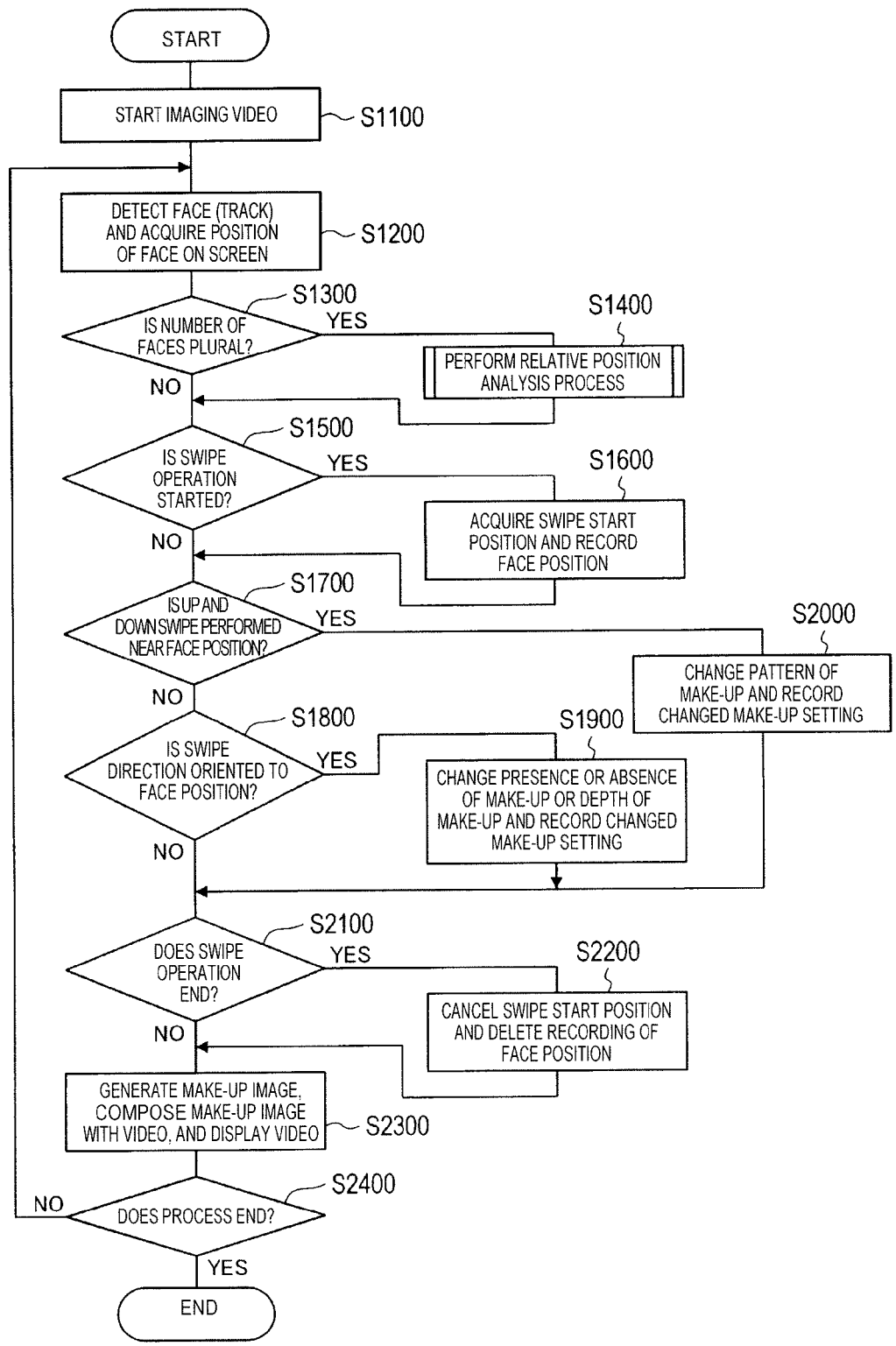
FIG. 9 is a flowchart illustrating an example of an operation of the image processing apparatus according to the first exemplary embodiment.

FIG. 9 is a flowchart illustrating an example of an operation of image processing apparatus 100. Here, an operation in regard to the swipe operation will be focused on in the description.

In step S1100, imaging unit 110 starts imaging a video. The video can include one face image or a plurality of face images when self-imaging is performed.

In step S1200, face-position acquirer 140 detects each face, acquires the position of each face on the screen, and records current position 323 of each face in state recording table 320 (see FIG. 4). Face-position acquirer 140 tracks the position of the face while the same face is continuously included in the screen and records start, continuity, or end of the tracking of the position in tracking state 326 of state recording table 320 whenever the tracking of the position starts, continues, or ends (see FIG. 4).

In step S1300, make-up-image composer 150 determines whether the number of faces included in the screen is plural. When the number of faces is plural (YES in S1300), make-up-image composer 150 causes the process to proceed to step S1400. Conversely, when the number of faces is not plural (NO in S1300), make-up-image composer 150 causes the process to proceed to step S1500 to be described below.

In step S1400, make-up-image composer 150 performs a relative position analysis process. The relative position analysis process is a process of analyzing the relative positions of the plurality of faces and appropriately reapplying the make-up setting. The details of the relative position analysis process will be described below.

In step S1500, make-up-image composer 150 determines whether the swipe operation is performed. Whether the swipe operation starts is determined based on, for example, whether to satisfy the condition that the number of contact positions is one and the contact position is continuously moved after the start of the contact.

When the swipe operation starts (YES in S1500), make-up-image composer 150 causes the process to proceed to step S1600. Conversely, when the swipe operation does not start (NO in S1500), make-up-image composer 150 causes the process to proceed to step S1700 to be described below.

In step S1600, make-up-image composer 150 acquires a position at which the swipe operation is started (hereinafter referred to as a "swipe start position"). Make-up-image composer 150 records the face position of each face as swipe start position 324 in state recording table 320 (see FIG. 4).

In step S1700, make-up-image composer 150 determines whether the swipe operation in the up and down directions (hereinafter referred to as "up and down swipe") near the position of one face). This operation corresponds to the operation described in fifth screen state 415 in FIG. 5.

When the up and down swipe is performed near the face position (YES in S1700), make-up-image composer 150 causes the process to proceed to step S2000 to be described below. When the up and down swipe is not performed near the face position (NO in S1700), make-up-image composer 150 causes the process to proceed to step S1800.

In step S1800, make-up-image composer 150 determines whether the swipe direction is oriented to the position of one face based on the swipe start position, the swipe direction, and swipe start position 324 of each face (see FIG. 4). That is, make-up-image composer 150 determines whether the performed swipe operation is the face direction swipe operation. This operation corresponds to the operation described in first screen state 411 in FIG. 5, the operation described in third screen state 413 in FIG. 5, or the operation described in first screen state 421 in FIG. 6.

When the swipe direction is oriented to the face position (YES in S1800), make-up-image composer 150 causes the process to proceed to step S1900. Conversely, when the swipe direction is not oriented to the face position (NO in S1800), make-up-image composer 150 causes the process to proceed to subsequent step S2100.

In step S1900, make-up-image composer 150 changes presence or absence of the make-up or the depth of the make-up of the face to which the swipe direction is oriented and records changed make-up setting 322 in state recording table 320 (see FIG. 4). The change in the presence or absence of the make-up or the depth of the make-up corresponds to the change in the composed image described in second screen state 412 in FIG. 5 or fourth screen state 414 in FIG. 5.

On the other hand, in step S2000, make-up-image composer 150 changes the pattern of the make-up of the face which is the closest to the swipe start position and records changed make-up setting 322 in state recording table 320 (see FIG. 4). The change in the pattern of the make-up corresponds to the change in the composed image described in sixth screen state 416 in FIG. 5.

In step S2100, make-up-image composer 150 determines whether the swipe operation ends. Whether the swipe operation ends is determined based on, for example, whether touch is not detected.

When the swipe operation ends (YES in S2100), make-up-image composer 150 causes the process to proceed to step S2200. Conversely, when the swipe operation does not end (NO in S2100), make-up-image composer 150 causes the process to proceed to step S2300 to be describe below.

In step S2200, make-up-image composer 150 cancels the acquired swipe start position and deletes the recording of swipe start position 324 of each face from state recording table 320 (see FIG. 4). When a predetermined time passes after the start of the swipe operation irrespective of whether the swipe operation ends, make-up-image composer 150 may cancel the corresponding swipe start position and delete the recording of swipe start position 324.

In step S2300, make-up-image composer 150 appropriately generates the make-up image, composes the make-up image with the video to generate the virtual make-up video. Display unit 160 displays the generated virtual make-up video. The virtual make-up video includes not only the video with which the make-up image is composed but also the video with which the make-up image is not composed.

In step S2400, make-up-image composer 150 determines whether there is an instruction to end a process of generating and displaying the virtual make-up video through a user operation or the like. When there is no instruction to end the process is not received (NO in S2400), make-up-image composer 150 returns the process to step S1200. Conversely, when there is the instruction to end the process (YES in S2400), make-up-image composer 150 ends the series of processes.

Figure 10:
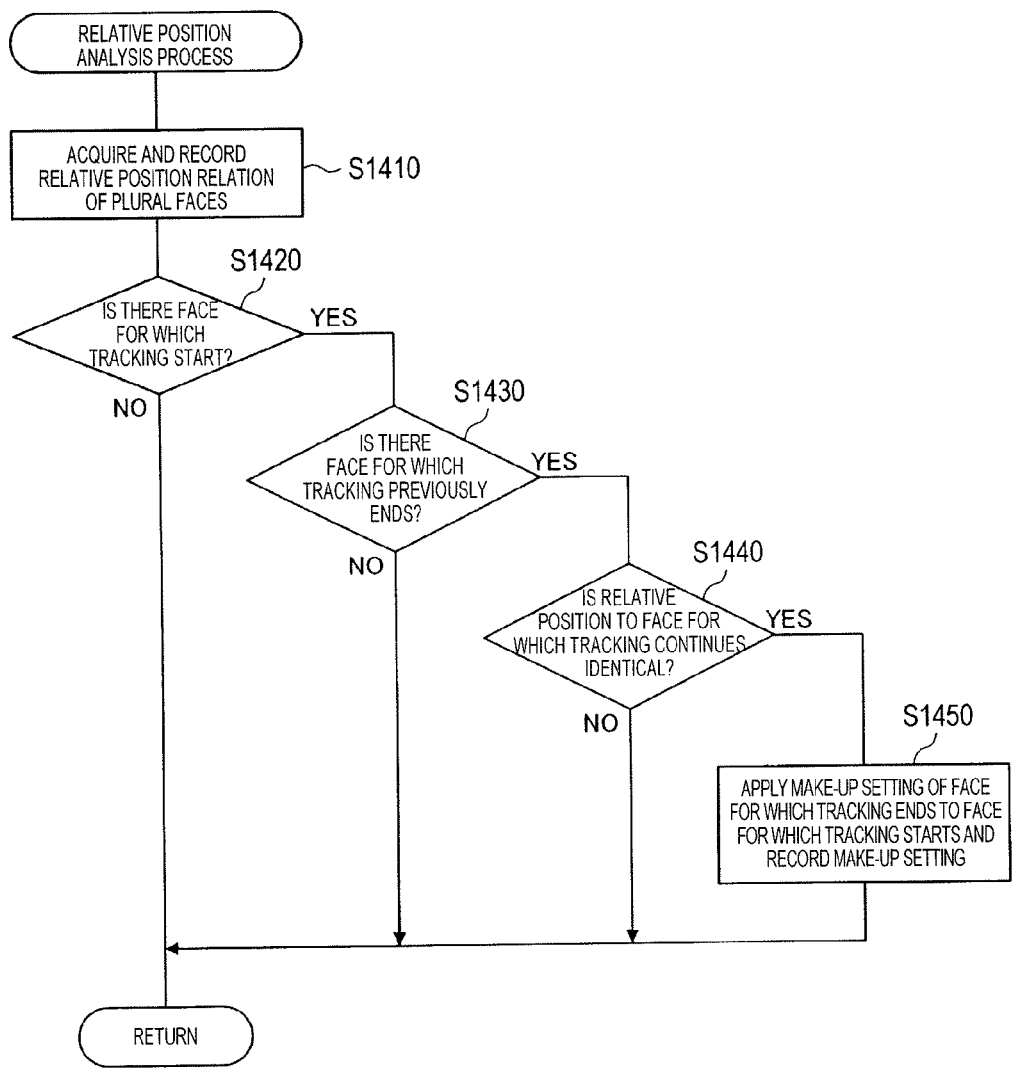
FIG. 10 is a flowchart illustrating an example of a relative position analysis process according to the first exemplary embodiment.

FIG. 10 is a flowchart illustrating an example of the relative position analysis process (step S1400 in FIG. 9).

In step S1410, make-up-image composer 150 acquires the relative position relation among the plurality of faces included in the screen and records the relative position relation in relative position 325 of state recording table 320. The acquisition of the relative position relation corresponds to the acquisition of relative positions $408_1$ and $408_2$ described in FIG. 8.

In step S1420, make-up-image composer 150 determines whether there is the face for which the tracking newly starts with reference to tracking state 326 of state recording table 320. When there is the face for which the tracking starts (YES in S1420), make-up-image composer 150 causes the process to proceed to step S1430. Conversely, when there is no face for which the tracking starts (NO in S1420), make-up-image composer 150 causes the process to proceed to step S1500 of FIG. 9 described above.

In step S1430, make-up-image composer 150 determines whether there is the face for which the tracking previously ends with reference to tracking state 326 (see FIG. 4) of state recording table 320. When there is the face for which the tracking ends (YES in S1430), make-up-image composer 150 causes the process to proceed to step S1440. Conversely, when there is no face for which the tracking ends (NO in S1430), make-up-image composer 150 causes the process to proceed to step S1500 of FIG. 9 described above.

In step S1440, make-up-image composer 150 acquires the relative position of the face for which the tracking previously ends, to the face for which the tracking continues with reference to relative position 325 (see FIG. 4) of state recording table 320. Then, make-up-image composer 150 determines whether the relative position of the face for which the tracking starts, to the face for which the tracking continues is identical to the acquired relative position. The determination of the relative position corresponds to the comparison between relative positions $408_1$ and $408_2$ described in FIG. 8.

When the relative position is identical (YES in S1440), make-up-image composer 150 causes the process to proceed to step S1450. Conversely, when the relative position is not identical (NO in S1440), make-up-image composer 150 causes the process to proceed to step S1500 of FIG. 9 described above.

In step S1450, make-up-image composer 150 applies the make-up setting of the face for which the tracking previously ends to the face for which the tracking starts and records the make-up setting. That is, make-up-image composer 150 describes make-up setting 322 of the face for which the tracking previously ends in make-up setting 322 of the face for which the tracking starts in state recording table 320. Then, make-up-image composer 150 causes the process to proceed to step S1500 of FIG. 9 described above.

Through the operation, image processing apparatus 100 can realize the virtual make-up operation so that the make-up setting is maintained without screening of the face region with the finger and without an influence of the shift of the face position on the screen even when one of the plurality of faces is temporarily deviated from the screen.

Advantages of First Exemplary Embodiment

As described above, image processing apparatus 100 according to the first exemplary embodiment can change the composition state of the make-up image on the face included in the video on the condition that the face direction swipe operation is performed on the screen. That is, by using image processing apparatus 100, the operation of changing the composition state of the make-up image can be performed so that the user does not screen the region in which the face is shown with the finger. Thus, the self-imaging can be performed while confirming the appearance of the face in the video on the screen. Accordingly, image processing apparatus 100 enables the virtual make-up operation to be performed while performing the self-imaging.

Image processing apparatus 100 according to the first exemplary embodiment decides the touch operation target using the position of the face at the time of the start of the touch operation including the swipe operation as the reference. Accordingly, image processing apparatus 100 can realize the operation desired by the user without the influence of the shift of the position of the face on the screen caused due to movement of a subject or image processing apparatus 100.

Image processing apparatus 100 according to the first exemplary embodiment acquires the relative position relation when the plurality of faces are included in the screen and determines whether the make-up setting is maintained for each face based on whether the tracking of the position continues and whether the relative position relation is maintained. Accordingly, even when one of the plurality of faces are temporarily deviated from the screen due to the movement of image processing apparatus 100, image processing apparatus 100 can continuously compose the make-up image set by the user on the face.

That is, image processing apparatus 100 according to the first exemplary embodiment can realize a simpler and more intuitive virtual make-up operation interface than in the technology of the related art.

Modification Examples of First Exemplary Embodiment

The method of deciding the face which is the swipe operation target is not limited to the above-described examples. For example, make-up-image composer 150 may change the composition state of the make-up image on the condition that a distance between a position at which the swipe operation in the direction oriented to the position of the face is performed and the position of the face on the screen is equal to or less than a predetermined threshold value.

For example, when the swipe operation is performed in the directions oriented to the positions of the plurality of faces included in the screen, make-up-image composer 150 may set the face for which the distance to the position at which the swipe operation is performed is the shortest on the screen among the plurality of faces, as a target for which the composition state of the make-up image is changed.

For example, make-up-image composer 150 may decide whether the face is set to a target for which the composition state of the make-up image is changed, based on a direction difference from the face position of the swipe operation and a distance to the face position of the swipe operation. More specifically, for example, make-up-image composer 150 sets the fact that a value obtained by adding a value obtained through multiplication of the direction difference and a first coefficient and a value obtained through multiplication of the distance and a second coefficient is equal to or less than a predetermined threshold value, as the condition of the face which is a target for which the composition state of the make-up image is changed. Here, the direction difference is a direction difference on the screen between the swipe direction of the swipe operation and the direction of the face toward the position at which the swipe operation is performed. The distance is a distance between the position at which the swipe operation is performed and the position of the face. The position at which the swipe operation is performed is, for example, the start position of the swipe operation, the end position of the swipe operation, or the central position of the entire touch region of the swipe operation.

The method of changing the composition state of the make-up image is not limited to the above-described examples. For example, make-up-image composer 150 may change the make-up pattern when the swipe operation is performed in the direction oriented to the position of the face with which the make-up image is composed.

The number of pieces of make-up image data and content of the make-up image data are not limited to the above-described examples. For example, make-up image information 310 may describe, for example, make-up image data in regard to combinations of four or more make-up patterns and four or more make-up depths. For example, make-up image information 310 may describe only one kind of make-up image data in regard to at least one of the make-up pattern and the make-up depth. Further, make-up image information 310 may describe different make-up image data according to a make-up target such as men make-up and women make-up. In this case, make-up-image composer 150 necessarily recognizes an operation of changing the make-up target.

The received touch operation other than the swipe operation is not limited to the above-described example. For example, make-up-image composer 150 may change the make-up pattern or the make-up depth when a touch operation of displaying a circle mark on the face is performed on the face with which the make-up image is composed.

The method of deciding the touch operation target using the position of the face at the time of the start of the touch operation as the reference may be applied to any of various touch operations other than the swipe operation.

The method of deciding the touch operation target using the position of the face at the time of the start of the touch operation as the reference is not limited to the above-described example. For example, make-up-image composer 150 may stop inputting (updating) information indicating the video, the position of the face, and the position of the face part until the touch operation is completed after the start of the touch operation. The stop of the inputting of the information may be performed by imaging unit 110 and face-position acquirer 140 by acquiring operation information.

The method of maintaining the make-up setting regarding the face deviated from the screen is not limited to the above-described examples. For example, when one face is deviated from the screen, make-up-image composer 150 may maintain the relative position of the face at the time at which the face is finally shown on the screen using the position of the face for which the tracking continues as a reference, until a predetermined time-out period passes. In this case, when the face deviated from the screen is returned to the screen before the time-out period passes, the tracking of the face continues.

Alternatively, make-up-image composer 150 may apply the make-up setting of the face for which the tracking of the position ends within a previous predetermined time (for example, within 3 seconds) to the face for which the tracking of the position starts irrespective of the relative position relation among the plurality of faces. For example, when only one face is deviated from the video at a time, for example, only one face is shown in the video, the make-up setting can be appropriately maintained.

When the make-up pattern or the make-up depth is changed, make-up-image composer 150 may notify the user that the make-up pattern or the make-up depth is changed. The notification is preferably notification easily recognized by the user and can be performed, for example, by any of various effect processes such as outputs of blinking or color change of the make-up image, indication of an effect image such as a blinking star image, and an effect sound such as a sound similar to blinking of a star.

The apparatus to which image processing apparatus 100 is applied is not limited to the above-described example. Image processing apparatus 100 may be applied to, for example, a tablet terminal, a personal computer, or a digital still camera.

For example, a part of the configuration of image processing apparatus 100 may be disposed in a server or the like on a network to be distant from the other parts of the configuration of image processing apparatus 100. In this case, each of these parts necessarily includes a communication unit to perform mutual communication.

Second Exemplary Embodiment

Hereinafter, a second exemplary embodiment of the present disclosure will be described in detail with reference to the drawings.

Overview of Apparatus

First, the overview of the image processing apparatus according to the second exemplary embodiment will be described.

Figure 11:
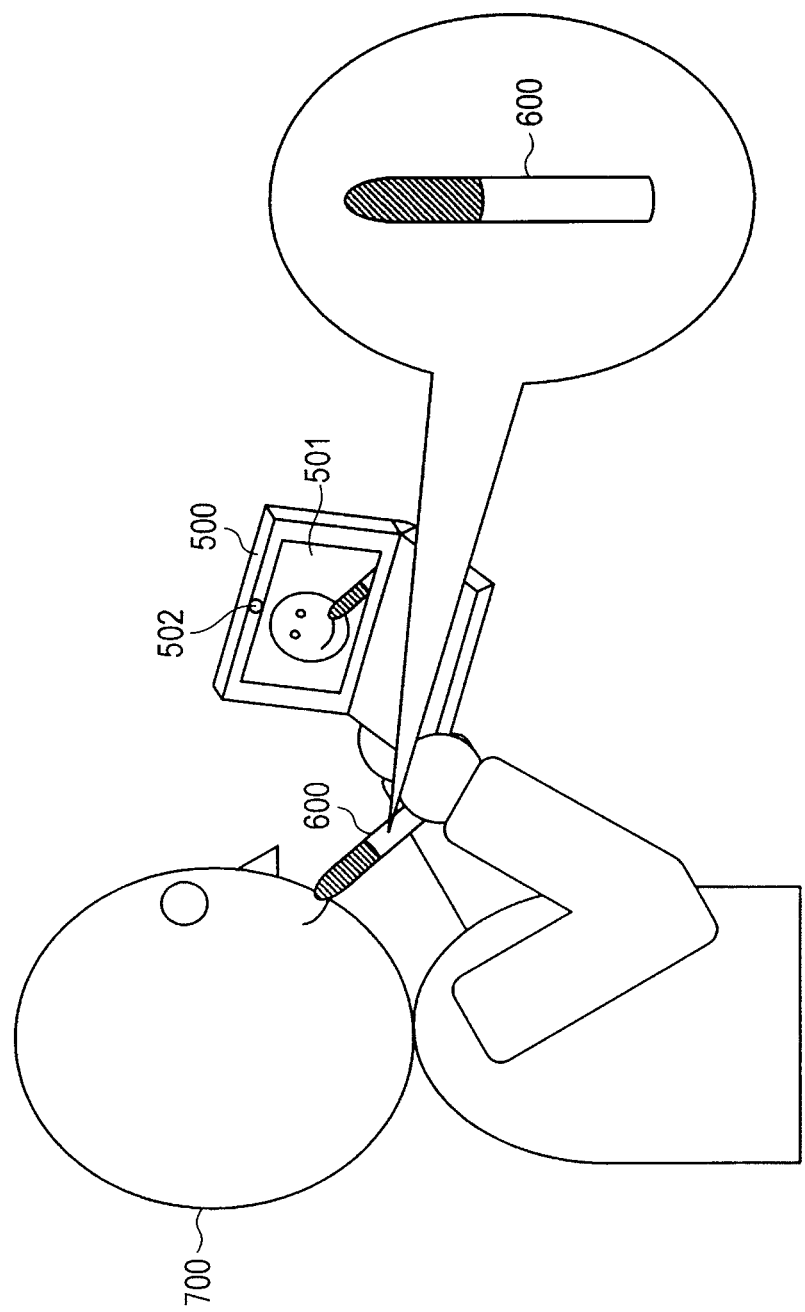
FIG. 11 is a diagram illustrating an example of the overview of an image processing apparatus according to a second exemplary embodiment.

FIG. 11 is a diagram illustrating an example of the overview of the image processing apparatus according to the second exemplary embodiment.

As illustrated in FIG. 11, image processing apparatus 500 has, for example, an outer appearance resembling a foldable compact mirror. Image processing apparatus 500 includes liquid crystal display (LCD) 501 in a part corresponding to a glass of the compact mirror and further includes miniature digital still camera 502 near liquid crystal display 501. A touch panel may be attached to liquid crystal display 501. Digital still camera 502 may be a stereo camera capable of performing stereo imaging.

Image processing apparatus 500 and stylus 600 are used as a set. User 700 using image processing apparatus 500 and stylus 600 is, for example, an elementary school girl. Image processing apparatus 500 horizontally reverses a video imaged by digital still camera 502 and displays the video on liquid crystal display 501. User 700 chooses stylus 600 as a make-up article such as the tip of a lipstick or an eye shadow while viewing her face shown on liquid crystal display 501 and performs an operation imitating an adult make-up.

When user 700 performs a make-up operation, image processing apparatus 500 composes a make-up image with a region which is a make-up operation target in the displayed video.

Figure 12A:
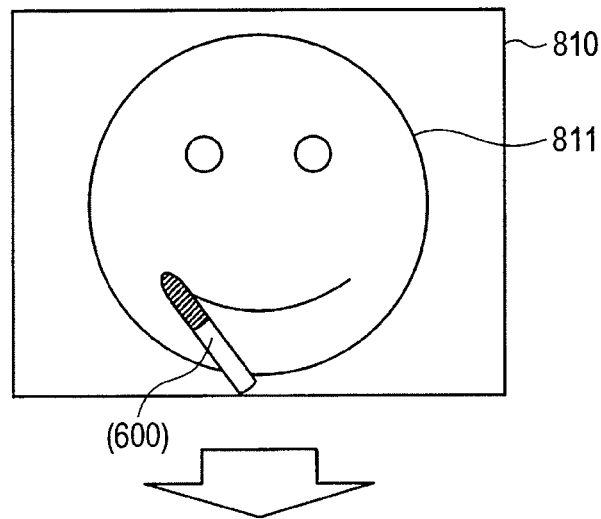
FIG. 12A is a diagram illustrating an example of a change of an image according to the second exemplary embodiment.
Figure 12B:
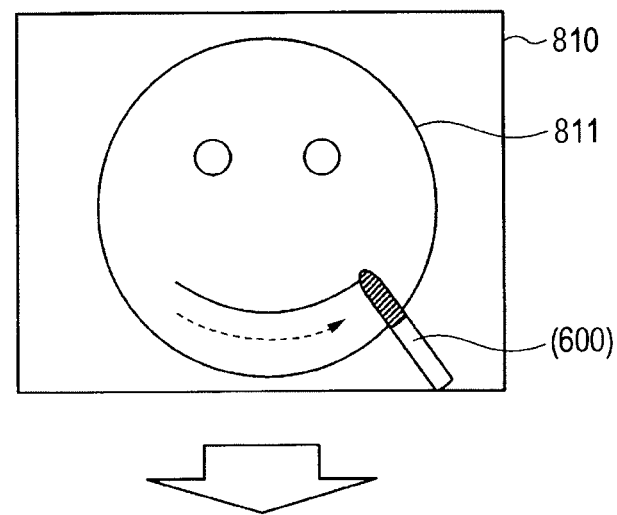
FIG. 12B is a diagram illustrating the example of the change of the image according to the second exemplary embodiment.
Figure 12C:
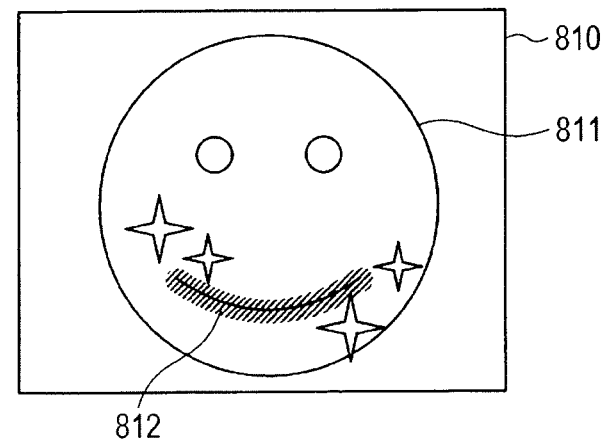
FIG. 12C is a diagram illustrating the example of the change of the image according to the second exemplary embodiment.

FIGS. 12A to 12C are diagrams illustrating an example of a change in an image shown in liquid crystal display 501.

As illustrated in FIG. 12A, face 811 of the user is included in image 810 shown on liquid crystal display 501. As illustrated in FIG. 12B, user 700 is assumed to perform an operation of tracking her lip with the front of stylus 600. Then, as illustrated in FIG. 12C, image processing apparatus 500 generates and displays image 810 in which make-up image 812 is composed with the lip. Accordingly, image processing apparatus 500 can provide the sense of real make-up to user 700.

However, to realize such an operation, image processing apparatus 500 necessarily detect this operation when user 700 performs a make-up operation.

Accordingly, image processing apparatus 500 acquires the position of the face from a video imaged by digital still camera 502 and detects a part of a predetermined marker color as stylus 600 from the video when the part of the predetermined marker color is included in the video. Accordingly, the predetermined marker color is applied to stylus 600. Then, when user 700 approaches stylus 600 to her face, that is, performs a make-up operation, image processing apparatus 500 can detect that user 700 performs the make-up operation.

Figure 13:
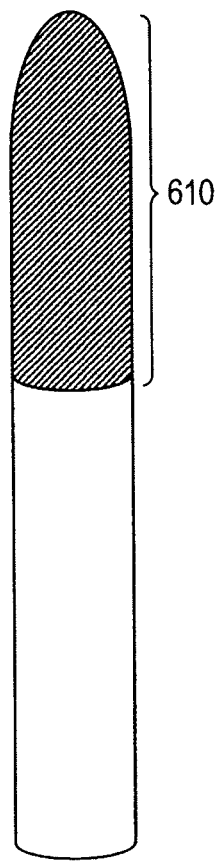
FIG. 13 is a diagram illustrating a first example of the outer appearance of a stylus according to the second exemplary embodiment.

FIG. 13 is a diagram illustrating an example of the outer appearance of stylus 600.

As illustrated in FIG. 13, stylus 600 is, for example, a bar-shaped member that has an outer appearance of a pen shape. In stylus 600, a predetermined marker color such as red is applied to region 610 including the front end. The marker color is preferably applied to a surface in directions of 360 degrees using the axis of stylus 600 as a center so that the marker color is more easily detected from the imaged video. Region 610 of the marker color can be assumed to be, for example, a paint applied to a bar-shaped member, a seal attached to the bar-shaped member, or a colored member configuring the bar-shaped member.

Image processing apparatus 500 may detect a predetermined single color as a marker color or may detect a plurality of predetermined colors as different marker colors. In the second exemplary embodiment, image processing apparatus 500 is assumed to detect the plurality of predetermined colors as different marker colors.

Configuration of Apparatus

Next, the configuration of image processing apparatus 500 will be described.

Figure 14:
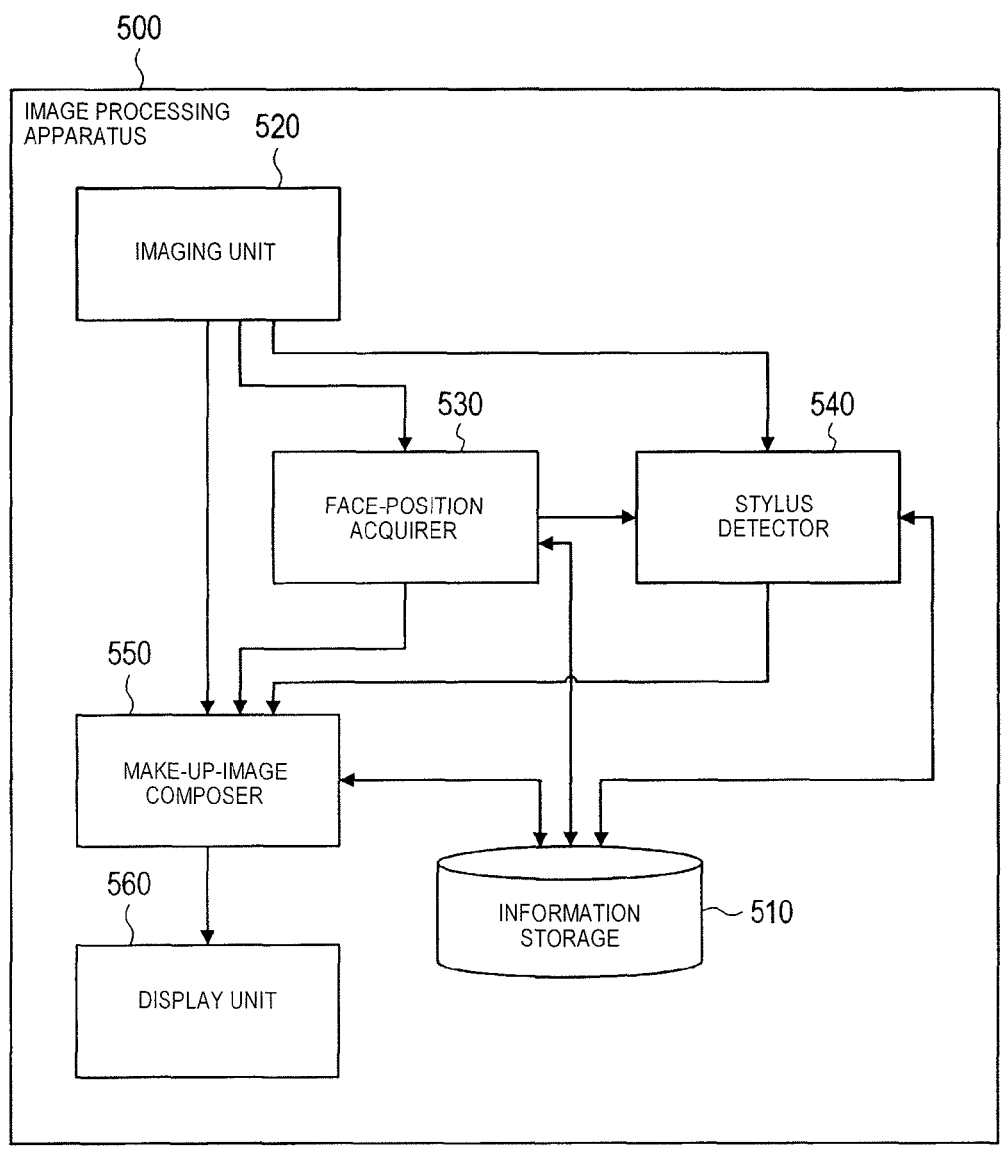
FIG. 14 is a block diagram illustrating an example of the configuration of an image processing apparatus according to the second exemplary embodiment.

FIG. 14 is a block diagram illustrating an example of the configuration of image processing apparatus 500.

In FIG. 14, image processing apparatus 500 includes information storage 510, imaging unit 520, face-position acquirer 530, stylus detector 540, make-up-image composer 550, and display unit 560.

Information storage 510 stores face feature information for detecting the face or face parts of a person included in an image from the image and a make-up image table for generating a make-up image and composing the make-up image with a part of the face of the video in advance.

The face feature information is, for example, information indicating image features such as the shapes of face parts such as eyes or lips generated by learning based on a plurality of face image samples or image features of the entire faces such as dispositions of the face parts or face color histograms generated by the learning. The face parts include face feature points such as the corners of eyes and angles of mouths.

The make-up image table is a table that describes content of a make-up image (hereinafter referred to as "make-up image data") for each predetermined marker color in regard to a plurality of predetermined marker colors in advance. In the second exemplary embodiment, the make-up image is assumed to be generated in units of regions in which make-up application targets such as lip regions, eyelid regions, and cheekbone regions are continuous (hereinafter referred to a "target region").

FIG. 15 is a diagram illustrating an example of content of the make-up image table.

As illustrated in FIG. 15, make-up image table describes make-up region 512, make-up color 513, and make-up depth 514 in association with marker color 511. Make-up region 512, make-up color 513, and make-up depth 514 are included in the make-up image data for each target region.

Marker color 511 describes the color of a target to be detected as a color indicating a stylus by image processing apparatus 500 for each color recognized as the same kind of stylus. Marker color 511 is indicated with a color name herein, but is actually a range of a coordinate value or the like in a predetermined color space such as RGB (Red, Green, and Blue). That is, marker color 511 is a color range with a certain degree of width.

Make-up region 512 is, for example, a region of the make-up image (that is, an application region of make-up) defined using the position of a face feature point such as an angle of a mouth as a reference. Make-up region 512 is indicated with a name of a face region herein, but is actually a coordinate value, a function, or the like in the space using the position of the face feature point as a reference.

Make-up color 513 is a color of the make-up image. Make-up color 513 is indicated with a color name herein, but is actually a coordinate value or the like in a predetermined color space such as RGB (Read, Green, and Blue) or HSV (Hue, Saturation, and Value). Make-up color 513 may not necessarily be identical to marker color 511, but is preferably a color approximate to marker color 511. Accordingly, user 700 can intuitively perform virtual make-up with a color close to a desired color.

Make-up depth 514 is the density (transparency) of the color of the make-up image when the make-up image is composed with a captured image. Make-up depth 514 is indicated with the transparency herein, but is actually a coefficient such as a composite ratio to a pixel value when the make-up image is composed with the captured image by α blend.

That is, the make-up image indicated by the make-up image data described in make-up image table 510 is an image indicating a make-up state when make-up is applied to a region (target region) decided in advance using a face feature point as a reference. Make-up region 512 is a target region which is a make-up application target.

Imaging unit 520 in FIG. 14 includes, for example, digital still camera 502 described above and images a video of the face of user 700 (see FIG. 11). Then, imaging unit 520 horizontally reverses the imaged video in the right and left directions and outputs the video to face-position acquirer 530, stylus detector 540, and make-up-image composer 550.

Face-position acquirer 530 acquires the positions of faces included in the video in order from the input video. More specifically, face-position acquirer 530 performs pattern matching of image features of the faces or the face parts on parts of image frames included in the video based on the face feature information. Accordingly, face-position acquirer 530 extracts the position of each of the face feature points included in the image frames from the image frames. Then, face-position acquirer 530 outputs information indicating the position of the extracted face feature point to stylus detector 540 and make-up-image composer 550.

When one of marker colors 511 (see FIG. 15) described in make-up image table is included in the input video, stylus detector 540 detects this portion as the stylus. As a method of detecting the portion of the marker color, for example, a detection method based on color histogram information, as described in Japanese Patent Unexamined Publication No. 2006-350967, can be adopted.

Stylus detector 540 determines whether a make-up operation (see FIGS. 12A to 12C) of approaching the stylus to one target region with reference to make-up region 512 (see FIG. 15) of make-up image table. This determination is performed based on the position of the face feature point indicated by the input information and the position of the detected stylus. Then, stylus detector 540 outputs information indicating the marker color detected on the condition that the make-up operation is performed to make-up-image composer 550.

Each of the position of the face part and the position of the stylus may be one of the position of the video in a two-dimensional space, the position of the real world in a three-dimensional space, and the position of video in a three-dimensional space in which a space axis in a distance direction with a face surface is combined in a two-dimensional space.

For example, when digital still camera 502 is a stereo camera, face-position acquirer 530 and stylus detector 540 can acquire the three-dimensional position of the face part or the stylus by calculating a parallax with the stereo image. An average value of the sizes of the faces and an average value of the sizes of the styluses in the video are assumed to be acquired in advance. In this case, face-position acquirer 530 and stylus detector 540 can acquire the three-dimensional position of the face part or the stylus by detecting the actual size of a face and the actual size of the stylus in the video.

Make-up-image composer 550 composes the make-up image associated in advance with the detected marker color on a part of the face of the video input on the condition that the stylus is detected. More specifically, when the information indicating the marker color is input, make-up-image composer 550 acquires the make-up image data corresponding to the marker color with reference to make-up image table 510 (see FIG. 15). Make-up-image composer 550 generates the make-up image based on the acquired make-up image data and composes the generated make-up image with the input video. Then, make-up-image composer 550 outputs the video with which the make-up image is appropriately composed to display unit 560.

Display unit 560 includes, for example, foregoing liquid crystal display 501 (see FIG. 11) and displays the input video with which the make-up image is appropriately composed (hereinafter referred to as a "virtual make-up video") to the screen of the liquid crystal display.

Although not illustrated, image processing apparatus 500 includes, for example, a central processing unit (CPU), a storage medium such as a read-only memory (ROM) storing a control program, and a working memory such as a random access memory (RAM). In this case, the function of each of the foregoing units is realized when the CPU executes the control program.

When user 700 approaches stylus 600 to her face, that is, performs a make-up operation, image processing apparatus 500 having such a configuration can detect stylus 600 and display the video of the face of user 700 with which the corresponding make-up image is composed.

Operation of Apparatus

Next, an operation of image processing apparatus 500 will be described.

Figure 16:
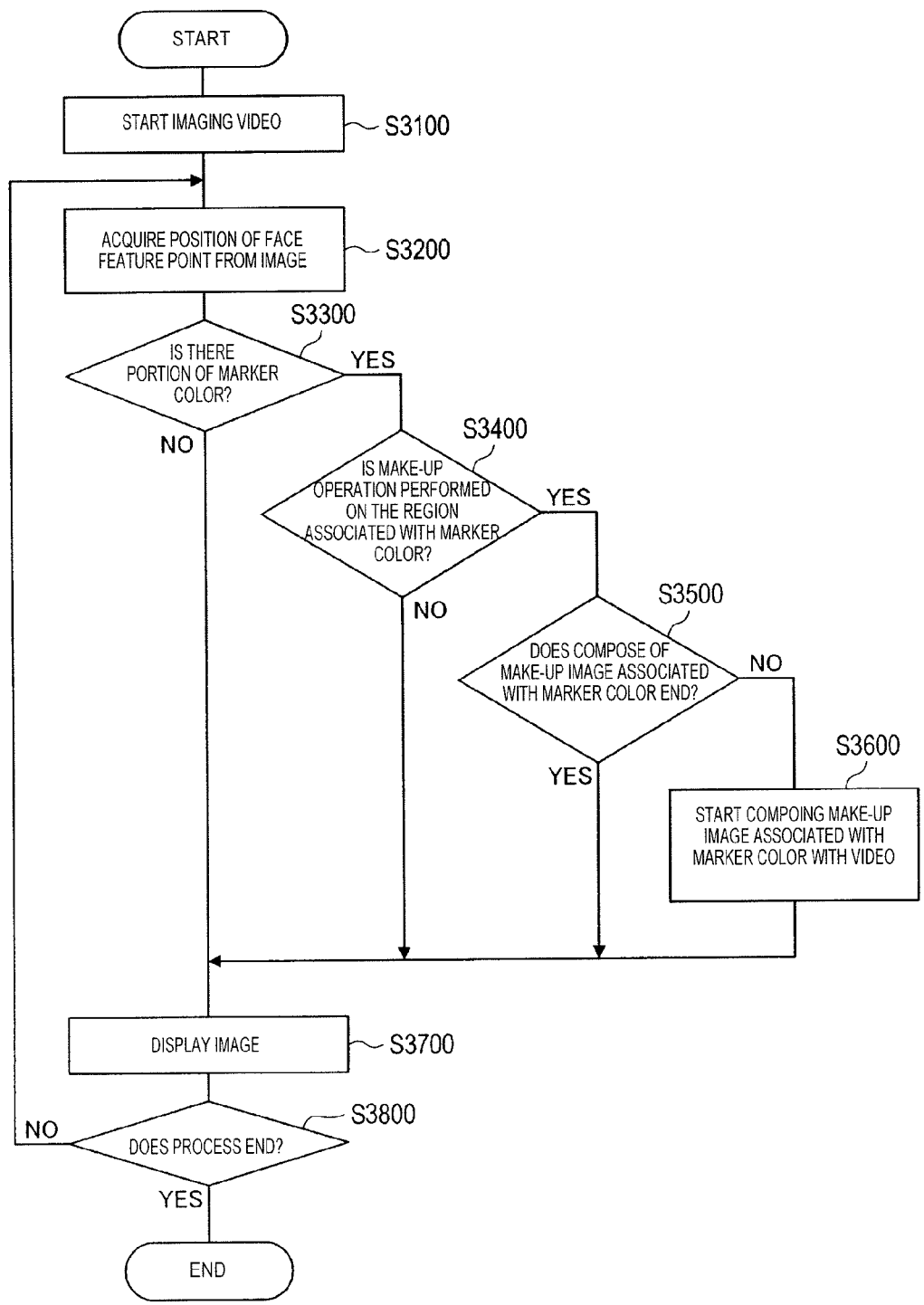
FIG. 16 is a flowchart illustrating an example of an operation of the image processing apparatus according to the second exemplary embodiment.

FIG. 16 is a flowchart illustrating an example of an operation of image processing apparatus 500.

In step S3100, imaging unit 520 starts imaging a video. The video can include the face of user 700 or stylus 600. Image processing apparatus 500 sequentially performs each of the subsequent processes for each image frame included in the video.

In step S3200, face-position acquirer 530 detects the position of the face feature point from the image when the face is included in the image.

In step S3300, stylus detector 540 detects the marker color from the image and determines whether there is a portion of the marker color in the image. When there is the portion of the marker color in the image (YES in S3300), stylus detector 540 causes the process to proceed to step S3400. When there is no portion of the marker color in the image (NO in S3300), stylus detector 540 causes the process to proceed to step S3700.

In step S3400, stylus detector 540 determines whether the make-up operation is performed on the target region (make-up region 512: see FIG. 15) associated with the detected marker color. That is, stylus detector 540 determines whether the portion (stylus 600) of the detected marker color approaches the corresponding target region. The fact that the portion of the marker color approaches the corresponding target region means that, for example, the distance between the position of stylus 600 and the target region decided by the face feature point is equal to or less than a predetermined value.

When the make-up operation is performed (YES in S3400), stylus detector 540 causes the process to proceed to step S3500. When the make-up operation is not performed (NO in S3400), stylus detector 540 causes the process to proceed to step S3700.

Stylus detector 540 may restrict a detection target marker color for each target region based on make-up image table 510 (see FIG. 15). In this case, steps S3300 and S3400 can be processed as one process. When face-position acquirer 530 detects the face region, stylus detector 540 may restrict the target region to the detected face region and detect each marker color.

Even when user 700 does not intend to perform a make-up operation, user 700 may approach stylus 600 to a target region in some cases. Accordingly, stylus detector 540 determines that the make-up operation is performed on the condition that the approach state of stylus 600 to the target region continues for a time equal to or greater than a predetermined time such as 1 second.

In step S3500, make-up-image composer 550 determines whether the composition of the make-up image associated with the detected marker color ends. The make-up image is an image generated based on the make-up image data (512 to 514: see FIG. 15) corresponding to the detected marker color. When the composition of the make-up image does not end (NO in S3500), make-up-image composer 550 causes the process to proceed to step S3600. Conversely, when the composition of the make-up image ends (YES in S3500), make-up-image composer 550 causes the process to proceed to step S3700 to be described below.

In step S3600, make-up-image composer 550 generates the make-up image associated with the detected marker color and starts composing the make-up image with the captured image. That is, make-up-image composer 550 continues to compose the make-up image in the subsequent video. The composition of the make-up image continues, for example, by regenerating the make-up image based on the recent position of the face feature point or transforming the generated make-up image to a form remaining in accordance with the recent position of the face feature point.

It takes several seconds for user 700 to start using stylus 600 and complete a desired make-up operation. Accordingly, make-up-image composer 550 preferably provides a time difference of about several seconds until the composition of the corresponding make-up-image is started after the detection of the predetermined marker color.

In step S3700, display unit 560 displays the generated virtual make-up video. The virtual make-up video includes not only the video on which the make-up image is composed but also the video on which the make-up image is not composed.

In step S3800, make-up-image composer 550 determines whether there is an instruction to end the process of generating and displaying the virtual make-up video through a user operation or the like. When there is no instruction to end the process (NO in S3800), make-up-image composer 550 returns the process to step S3200 to move to the process on the subsequent image frame or the recent image frame. When there is the instruction to end the process (YES in S3800), make-up-image composer 550 ends the series of processes.

Through such an operation, image processing apparatus 500 can generate and display the virtual make-up video in which the make-up image is composed on the region when user 700 performs the make-up operation of approaching stylus 600 to the target region such as her lip.

The difference in the marker color (that is, the difference in stylus 600) is shown as a difference in the region or the color of the make-up image in the virtual make-up video.

Figure 17A:
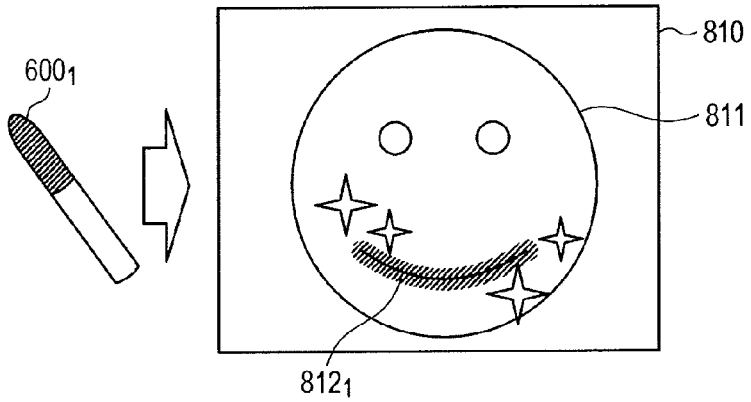
FIG. 17A is a diagram illustrating an example of virtual make-up according to the second exemplary embodiment.
Figure 17B:
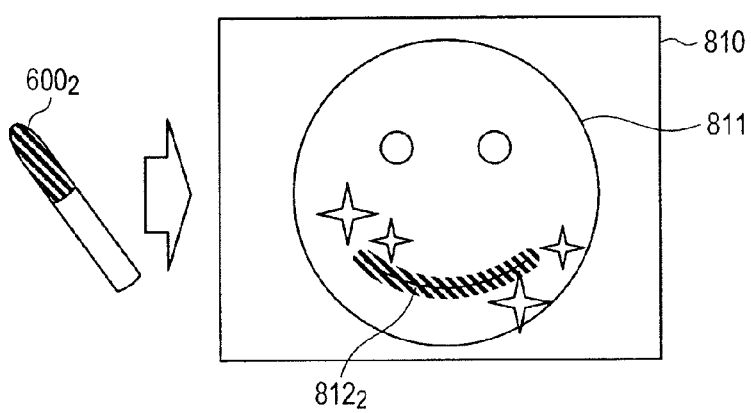
FIG. 17B is a diagram illustrating an example of the virtual make-up according to the second exemplary embodiment.
Figure 17C:
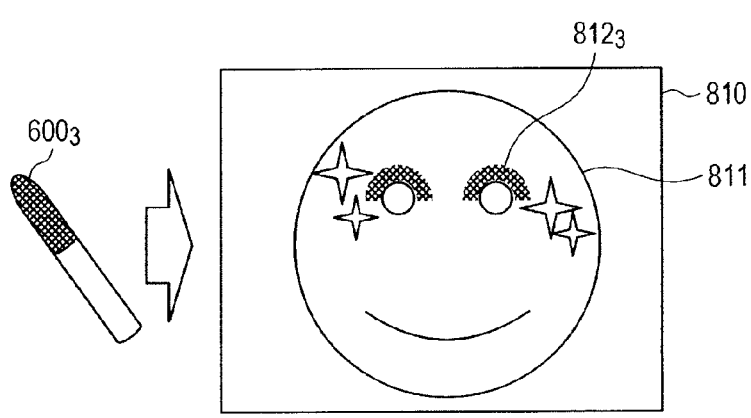
FIG. 17C is a diagram illustrating an example of the virtual make-up according to the second exemplary embodiment.

FIGS. 17A to 17C are diagrams illustrating examples of the difference in the virtual make-up video by stylus 600 and correspond to FIG. 12C. The same reference numerals are given to portions corresponding to the portions in FIG. 12C and the description thereof will be omitted.

FIG. 17A illustrates an example when the stylus with a red marker color is used. FIG. 17B illustrates an example when the stylus with a pink marker color is used. FIG. 17C illustrates an example when the stylus with a light blue marker color is used. The marker colors of styluses $600_1$ to $600_3$ illustrated in FIGS. 17A and 17C are red, pink, and light blue in order.

As illustrated in FIG. 17A, when red stylus $600_1$ is used, image processing apparatus 500 compose red make-up image $812_1$ with the lip part based on make-up image table (see FIG. 15). Similarly, as illustrated in FIG. 17B, when pink stylus $600_2$ is used, image processing apparatus 500 composes coral pink make-up image $812_2$ on the lip part. Further, as illustrated in FIG. 17C, when light blue stylus $600_2$ is used, image processing apparatus 500 composes blue gray make-up image $812_3$ with the lip part.

In this way, image processing apparatus 500 composes the different make-up image with the video of the face of the user according to the marker color of stylus 600.

Advantages of Second Exemplary Embodiment

In this way, image processing apparatus 500 according to the second exemplary embodiment acquires the position of the face included in the video from the imaged video and detects a portion as the stylus when the portion with a predetermined marker color is included in the video. Then, image processing apparatus 500 according to the second exemplary embodiment displays the imaged video and composes the make-up image associated in advance with the predetermined marker color with a part of the face of the video at that time on the condition that the stylus is detected. Accordingly, image processing apparatus 500 can perform the virtual make-up by the make-up operation.

As illustrated in make-up image table 510 in FIG. 15, image processing apparatus 500 restricts the make-up target region for each marker color. Accordingly, even when stylus 600 approaches a portion other than the target region decided for each stylus 600, image processing apparatus 500 does not compose the make-up image with the portion. Accordingly, image processing apparatus 500 can avoid, for example, a situation in which a lipstick is erroneously applied to an eyelid in the virtual make-up video.

Modification Example 1

Another Example of Stylus Identifying Method

The method of identifying stylus 600 is not limited to the above-described examples. For example, when a portion of a predetermined color disposition pattern formed by a plurality of predetermined colors is included, image processing apparatus 500 may detects the portion as the above-described marker color from the video. In this case, the color disposition pattern can be used as an identification code of stylus 600, and thus detection precision of stylus 600 can be improved and the number of identified styluses 600 can be increased.

Figure 18:
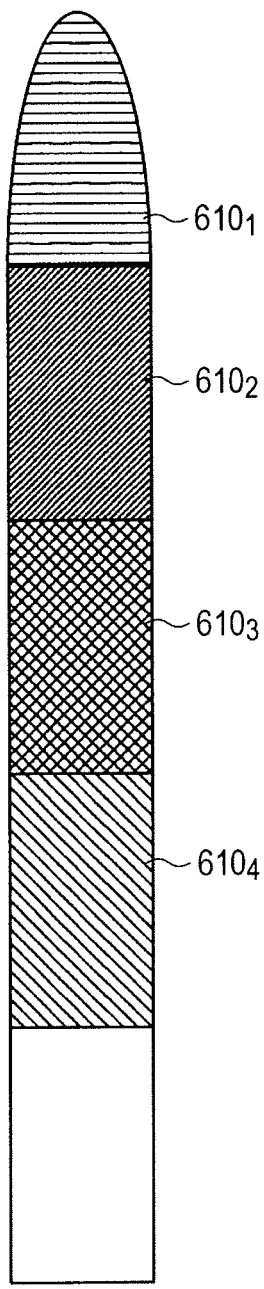
FIG. 18 is a diagram illustrating an example of the outer appearance of a stylus according to Modification Example 1 of the second exemplary embodiment.

FIG. 18 is a diagram illustrating an example of the outer appearance of a stylus on which the color disposition pattern is applied and corresponds to FIG. 13.

As illustrated in FIG. 18, colors are applied to first region $610_1$ to fourth region $610_4$ continuing from the front end of stylus 600a. The applied colors may be identical or different among first region $610_1$ to fourth region $610_4$. However, the colors are preferably different between regions 610 mutually adjacent to each other among first region $610_1$ to fourth region $610_4$. A color approximate to a make-up color associated with the color disposition pattern is preferably applied to at least one of first region $610_1$ to fourth region $610_4$.

A combination and an order of the colors applied to first region $610_1$ to fourth region $610_4$ configure the color disposition pattern applied to stylus 600a. The number of regions included in the color disposition pattern is not limited to four.

FIG. 19 is a diagram illustrating an example of content of the make-up image table when the color disposition pattern is used as a marker color and corresponds to FIG. 15. The same reference numerals are given to portions corresponding to the portions in FIG. 15 and the description thereof will be omitted.

As illustrated in FIG. 19, make-up image table 510a describes make-up region 512, make-up color 513, and make-up depth 514 in association with marker color 511a which is a color disposition pattern. Marker color 511a is shown as a picture of the color disposition pattern herein, but is actually information describing the range of coordinate values in a predetermined color space in a disposition order.

For example, when stylus detector 540 searches for the region of a color corresponding to first region $610_1$ (see FIG. 18) from an image and detects the region, stylus detector 540 searches for a region of a color corresponding to second region $610_2$ near the region. When stylus detector 540 detects the region of the color corresponding to second region $610_2$, stylus detector 540 further searches for third region $610_3$ and fourth region $610_4$ in this order in regions near in the detection direction.

When stylus detector 540 can distinguish and detect N kinds of colors, stylus detector 540 can identify N styluses 600 in stylus 600 of the marker color formed by a single color illustrated in FIG. 13 and can use N kinds of make-up images.

On the other hand, in stylus 600a in which the color disposition pattern of four regions illustrated in FIG. 18 is configured as marker colors, for example, N4 styluses 600 can be identified and N4 kinds of make-up images can be used. That is, image processing apparatus 500 can compose plentiful kinds of make-up images and expand a variation of the virtual make-up by adopting the color disposition pattern with the plurality of colors as the marker colors.

Further, when the marker color is a color disposition pattern of a plurality of colors, a possibility of a portion other than stylus 600 being erroneously detected as stylus 600 can be reduced further than when the marker color is a single color. On the other hand, when the marker color is the color disposition pattern of the plurality of colors, there is a high possibility of detection leakage due to, for example, screening of a part by a finger.

Accordingly, stylus detector 540 preferably tracks stylus 600a detected in a certain image frame in a subsequent video. This tracking is performed by tracking an image feature portion such as the color or shape of the front end of stylus 600a using a known target tracking technology for a video. In this case, the color of the region (first region $610_1$: see FIG. 18) of the front end of stylus 600a is preferably a predetermined single color.

Modification Example 2

Another Example of Color Decision Method

The method of deciding the color (make-up color) of the make-up image is not limited to the above-described example. For example, image processing apparatus 500 may decide the color of the make-up image based on the color applied to the stylus apart from the marker color.

Figure 20:
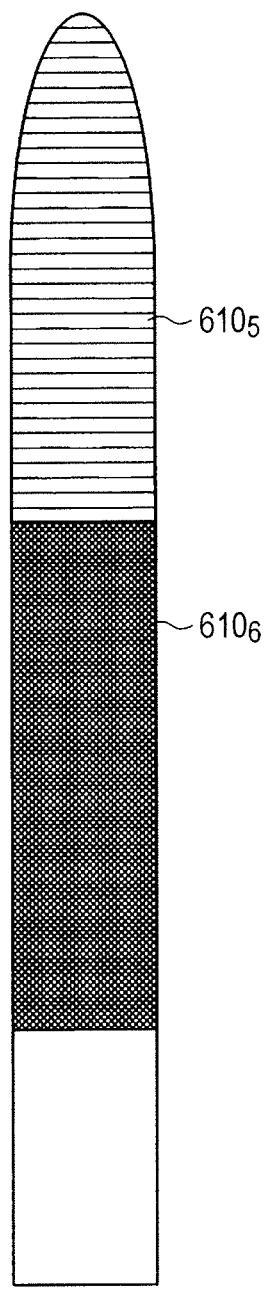
FIG. 20 is a diagram illustrating an example of the outer appearance of a stylus according to Modification Example 2 of the second exemplary embodiment.

FIG. 20 is a diagram illustrating an example of the outer appearance of the stylus on which a color other than the marker color is applied and corresponds to FIGS. 13 and 18.

As illustrated in FIG. 20, colors are applied to fifth region $610_5$ and sixth region $610_6$ continuing from the front end of stylus 600b. The color of sixth region $610_6$ is a color selected from one or a plurality of predetermined marker colors.

The color applied to fifth region $610_5$ is preferably a color other than the foregoing predetermined marker colors. Fifth region $610_5$ of the marker color can be assumed to be, for example, a paint applied to a bar-shaped member, a seal attached to the bar-shaped member, or a colored member configuring the bar-shaped member. The marker color is preferably a color which is a color such as green not excessively used for make-up and is different from the color of the face.

When stylus 600b is used, stylus detector 540 detects a color other than the color of the face included in a periphery region of a portion of a detected predetermined marker color from the periphery region in the video as the application-designated color. That is, stylus detector 540 detects the color of fifth region $610_5$ as an application-designated color. Then, make-up-image composer 550 generates a make-up image with a color approximate to the detected application-designated color.

In make-up image table 510 (see FIG. 15), it is not necessary to describe make-up color 513. Further, when the marker color is a single color and the target region is not restricted for each stylus 600b, the make-up image table describing the content of the make-up image for each marker color in advance is not necessarily provided. Instead of this table, image processing apparatus 500 may use a make-up image table describing a marker color and make-up image data other than a make-up color for each target region.

Figure 21:
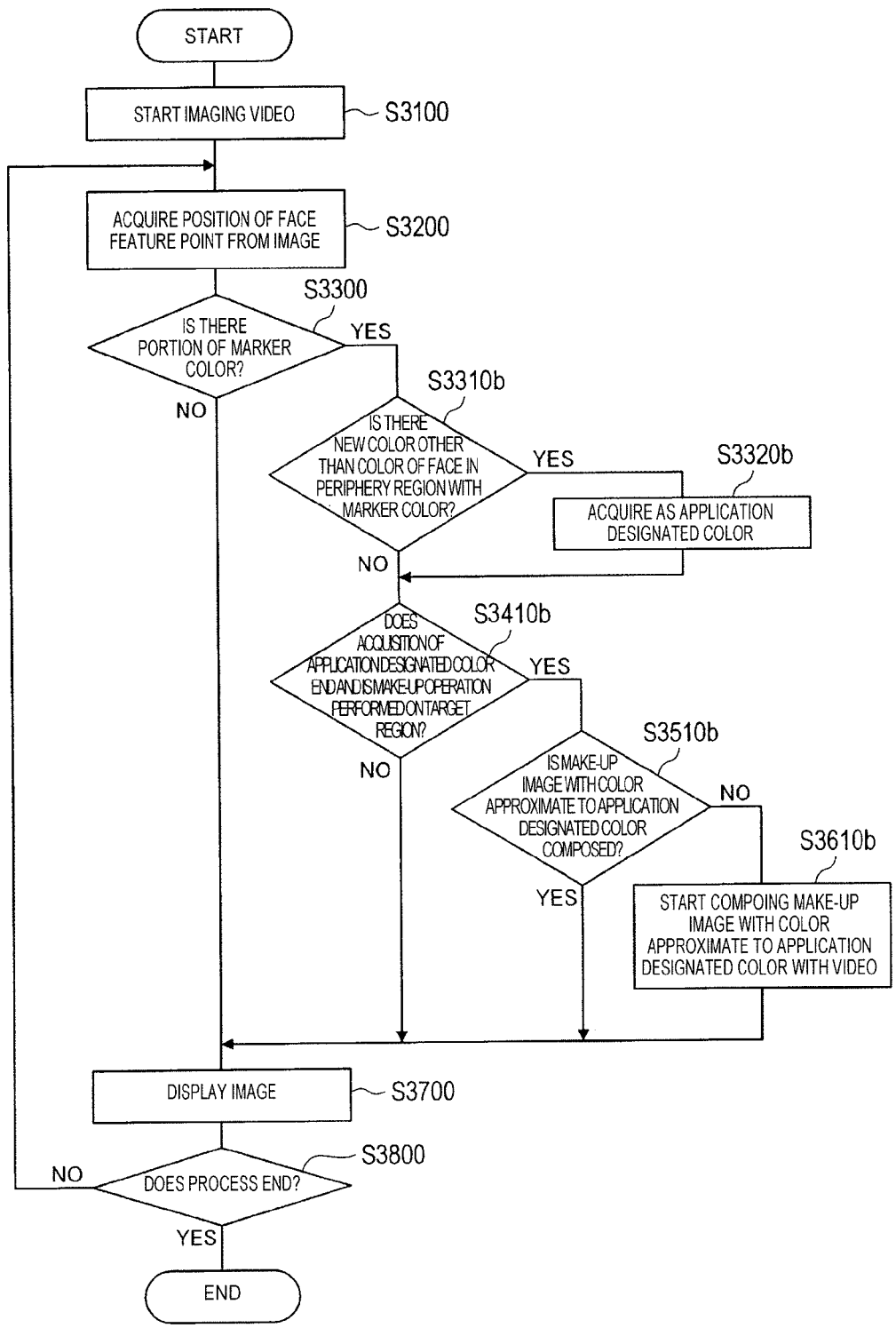
FIG. 21 is a flowchart illustrating an example of an operation of an image processing apparatus according to Modification Example 2 of the second exemplary embodiment.

FIG. 21 is a flowchart illustrating an example of an operation of image processing apparatus 500 when stylus 600b to which the marker color and an application designation color is applied is used and corresponds to FIG. 16. The same reference numerals are given to portions corresponding to the portions in FIG. 16 and the description thereof will be omitted.

When it is determined that there is the portion of the marker color in the image (YES in S3300), stylus detector 540 causes the process to proceed to step S3310b.

In step S3310b, stylus detector 540 detects a color other than the color of the face in the periphery region of the portion of the marker color and determines whether there is the portion with the color other than the color of the face. More specifically, for example, when face-position acquirer 530 detects the face region, stylus detector 540 estimates the colors of parts of the face including skin, lip, eye, eyelash, and eyebrow parts based on color histogram information of the detected face region. Then, stylus detector 540 detects the color of the part which is different from the estimated color and has a predetermined area as the color other than the color of the face.

For example, when the image includes fifth region $610_5$ and sixth region $610_6$ of stylus 600b illustrated in FIG. 20, sixth region $610_6$ has the marker color. Therefore, stylus detector 540 detects the color of fifth region $610_5$.

When there is the portion with the color other than the color of the face in the periphery region of the portion with the marker color (YES in S3310b), stylus detector 540 causes the process to proceed to step S3320b. When there is no portion with the color other than the color of the face in the periphery region of the portion with the marker color (NO in S3310b), stylus detector 540 causes the process to proceed to step S3410b.

In step S3320b, stylus detector 540 acquires the color detected in step S3310b as the application-designated color.

Stylus detector 540 may track the portion with the marker color in the video and determine that the color with the same motion as the marker color as the above-described color other than the color of the face.

In step S3410b, stylus detector 540 determines whether the acquisition of the application-designated color ends and the make-up operation is performed on one target region. That is, stylus detector 540 determines whether the portion (stylus 600b) with the detected marker color approaches one of the pre-decided target regions.

When the acquisition of the application-designated color ends and the make-up operation is performed on the target region (YES in S3410b), stylus detector 540 causes the process to proceed to step S3510b. At this time, stylus detector 540 outputs information indicating the application-designated color and the target region which is the make-up operation target instead of the information indicating the above-described marker color to make-up-image composer 550. When the application-designated color is not acquired or the make-up operation is not performed on the target region (NO in S3410b) stylus detector 540 causes the process to proceed to step S3700.

In step S3510b, based on the input information, make-up-image composer 550 determines whether the make-up image with the color approximate to the application-designated color is already composed with the target region. When the make-up image with the color approximate to the application-designated color is composed with the target region (YES in S3510b), make-up-image composer 550 causes the process to proceed to step S3700. Conversely, when the make-up image with the color approximate to the application-designated color is not composed with the target region (NO in S3510b), make-up-image composer 550 causes the process to proceed to step S3610b.

In step S3610b, make-up-image composer 550 generates the make-up image with the color approximate to the application-designated color, starts composing the make-up image with the captured image, and causes the process to proceed to step S3700.

More specifically, for example, make-up-image composer 550 refers to information indicating a plurality of divided color spaces obtained by dividing a color space and stored in advance in information storage 510 and indicating a representative color such as an average color in each divided color space. Then, make-up-image composer 550 specifies the divided color space belonging to the application-designated color and decides the representative color of the specified divided color space as a make-up color of the make-up image.

Make-up-image composer 550 may adopt the acquired application-designated color as the make-up color without change or may adopt a color obtained by performing predetermined color conversion on the acquired application-designated color as the make-up color. Further, make-up-image composer 550 may acquire information regarding a surrounding environment such as an illumination state and decide content of the color conversion based on the acquired information.

Figure 22A:
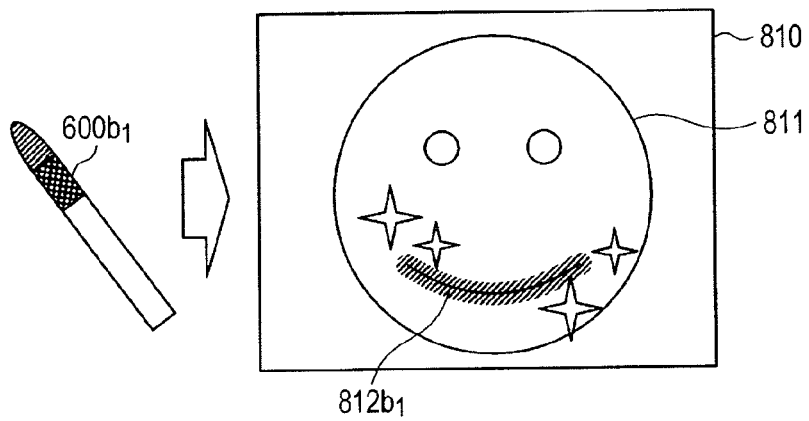
FIG. 22A is a diagram illustrating an example of virtual make-up according to Modification Example 2 of the second exemplary embodiment.
Figure 22B:
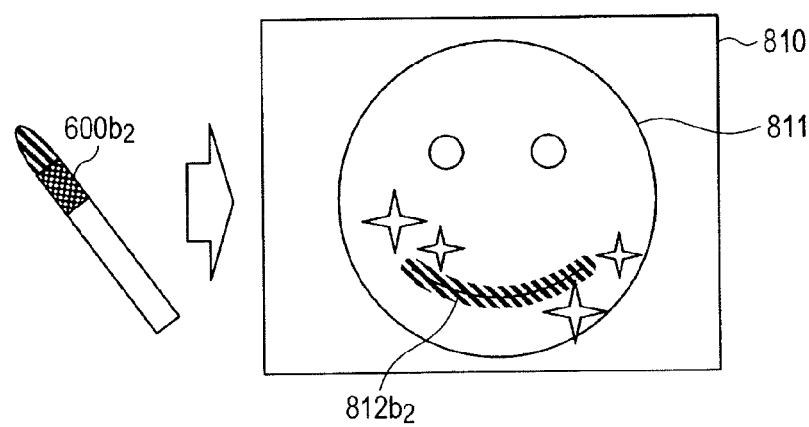
FIG. 22B is a diagram illustrating an example of virtual make-up according to Modification Example 2 of the second exemplary embodiment.
Figure 22C:
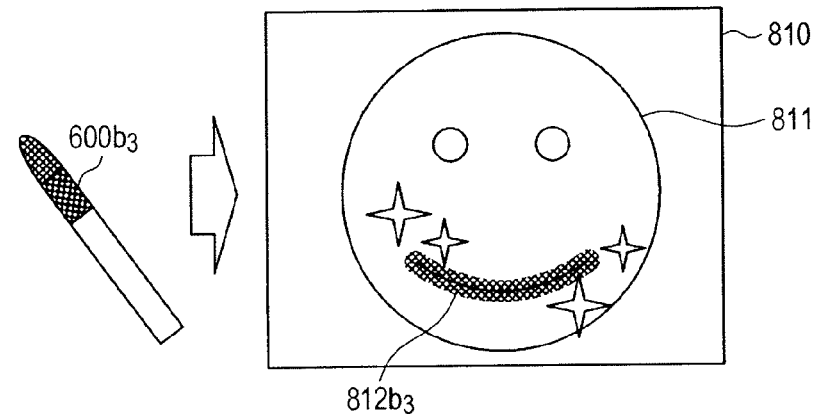
FIG. 22C is a diagram illustrating an example of virtual make-up according to Modification Example 2 of the second exemplary embodiment.

FIGS. 22A to 22C are diagrams illustrating an example of a difference in the virtual make-up video by the application-designated color of stylus 600b and correspond to FIGS. 12C and 17A to 17C. The same reference numerals are given to portions corresponding to the portions in FIGS. 12C and 17A to 17C and the description thereof will be omitted.

As illustrated in FIGS. 22A to 22C, an make-up operation is assumed to be performed on a lip using styluses 600b1 to 600b3 to which different application-designated colors are applied. In this case, image processing apparatus 500 composes make-up images 812b1 to 812b3 with colors approximate to the application-designated colors of styluses 600b with the lip region which is the make-up operation target.

When the make-up colors are decided based on the marker colors, it is necessary to restrict the kinds of make-up images according to the number of identifiable marker colors (color disposition pattern) and register a correspondence relation between the marker colors and the make-up colors in advance.

On the other hand, when stylus 600b illustrated in FIG. 20 is detected based on the marker color and the application-designated color is acquired from detected stylus 600b, it is not necessary to set a correspondence relation between the marker colors and the make-up colors in advance without the above-described restriction either. That is, image processing apparatus 500 can generate make-up images with plentiful color flexibility and expand a variation in the virtual make-up by adopting combination of the marker colors and the application-designated colors.

Other Modification Examples

The association of the marker color (the color disposition pattern) and the make-up image performed by image processing apparatus 500 is not limited to the above-described example. For example, make-up region 512 and make-up depth 514 may not necessarily be restricted for each marker color. Accordingly, user 700 can perform virtual make-up in a plurality of target regions or all of the target regions with one stylus 600.

The shape of stylus 600 used in image processing apparatus 500, the dispositions of the marker color and the application-designated color in stylus 600, and the configuration of the color disposition pattern are not limited to the above-described examples. For example, stylus 600 may be formed in a shape or a material close to any of various cosmetics. For example, stylus 600 may be formed in a flat brush shape and material.

Image processing apparatus 500 may receive an input of a marker color from user 700. In this case, for example, stylus detector 540 displays a stylus registration screen to acquire a portion of stylus 600 from an imaged video on liquid crystal display 501 before performing the virtual make-up. Then, stylus detector 540 acquires the color of the acquired portion of stylus 600 via the stylus registration screen as a marker color affixed to stylus 600.

Figure 23:
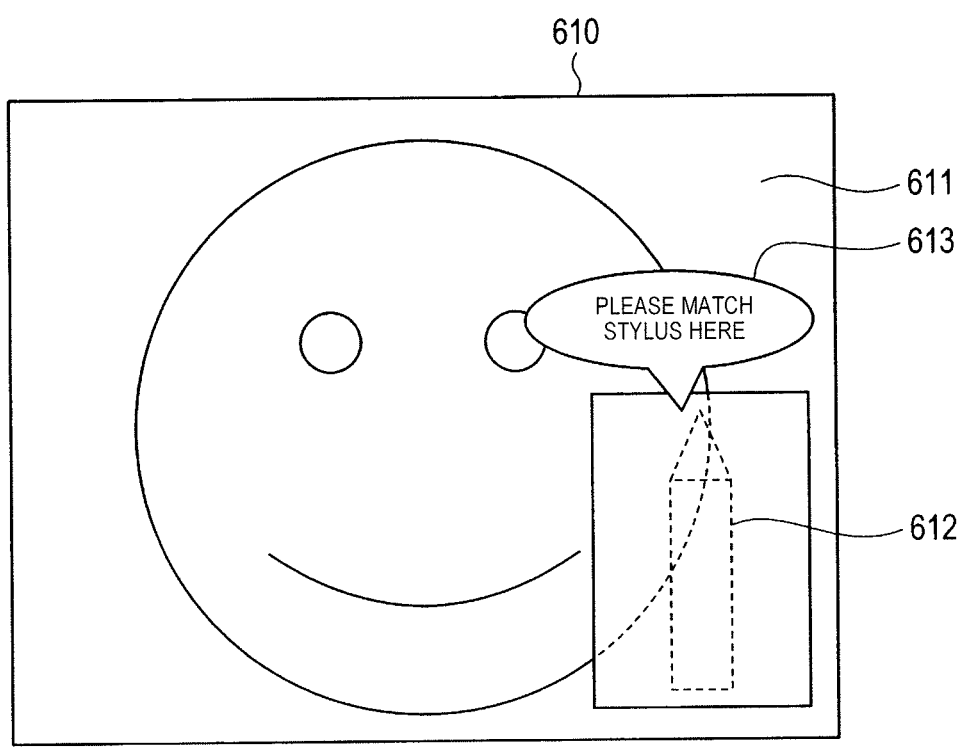
FIG. 23 is a diagram illustrating an example of a stylus registration screen according to the second exemplary embodiment.

FIG. 23 is a diagram illustrating an example of the stylus registration screen.

As illustrated in FIG. 23, stylus registration screen 610 includes, for example, position designation image 612 for designating the position of stylus 600 in imaged video 611 of digital still camera 502. Stylus registration screen 610 includes message 613 to instruct user 700 to hold stylus 600 so that the position of stylus 600 is matched with position designation image 612 in imaged video 611.

Stylus detector 540 determines whether stylus 600 can be matched with position designation image 612 by detecting the outer appearance of stylus 600 registered in advance or a code pattern affixed to stylus 600 registered in advance from imaged video 611. Then, when stylus 600 is matched with position designation image 612, stylus detector 540 acquires the color of a portion (for example, the front end portion of stylus 600) to which the marker color is affixed from imaged video 611 and acquires the acquired color as the marker color.

Make-up-image composer 550 may set the acquired color as a make-up color without change or may set a color associated in advance with the acquired color as a make-up color.

Stylus 600 of image processing apparatus 500 may be identified together using information as well as the color information. For example, when a radio frequency identification (RFID) tag is mounted on stylus 600, stylus detector 540 may identify stylus 600 based on a combination of information indicated by a wireless signal from the RFID tag and the color information of stylus 600.

The composition of the make-up image performed by image processing apparatus 500 may not be restricted to the above-described target region. That is, image processing apparatus 500 may recognize each part of the entire face as a make-up operation target.

In this case, when a sense closer to actual make-up is provided to user 700, stylus detector 540 detects whether user 700 desirably touches stylus 600 on the surface of the face and decides the portion with which stylus 600 is touched as a make-up region. This detection can be performed, for example, by detecting the three-dimensional position of each part on the surface of the face and the three-dimensional position of the front end of stylus 600 with high precision or by wirelessly receiving sensor information of a press sensor mounted on the front end of stylus 600.

Alternatively, stylus detector 540 may further analyze a motion of stylus 600 (the region of the marker color) near the target region or a finer position relation between the target region and stylus 600 and determine whether the make-up operation is performed on the target region. Specifically, for example, stylus detector 540 determines the make-up operation by registering a pattern (gesture) of a motion of predetermined stylus 600 in advance as a make-up operation for each target region and detecting the gesture.

For example, the gesture can be defined using a plurality of reference points set on the face.

Figure 24:
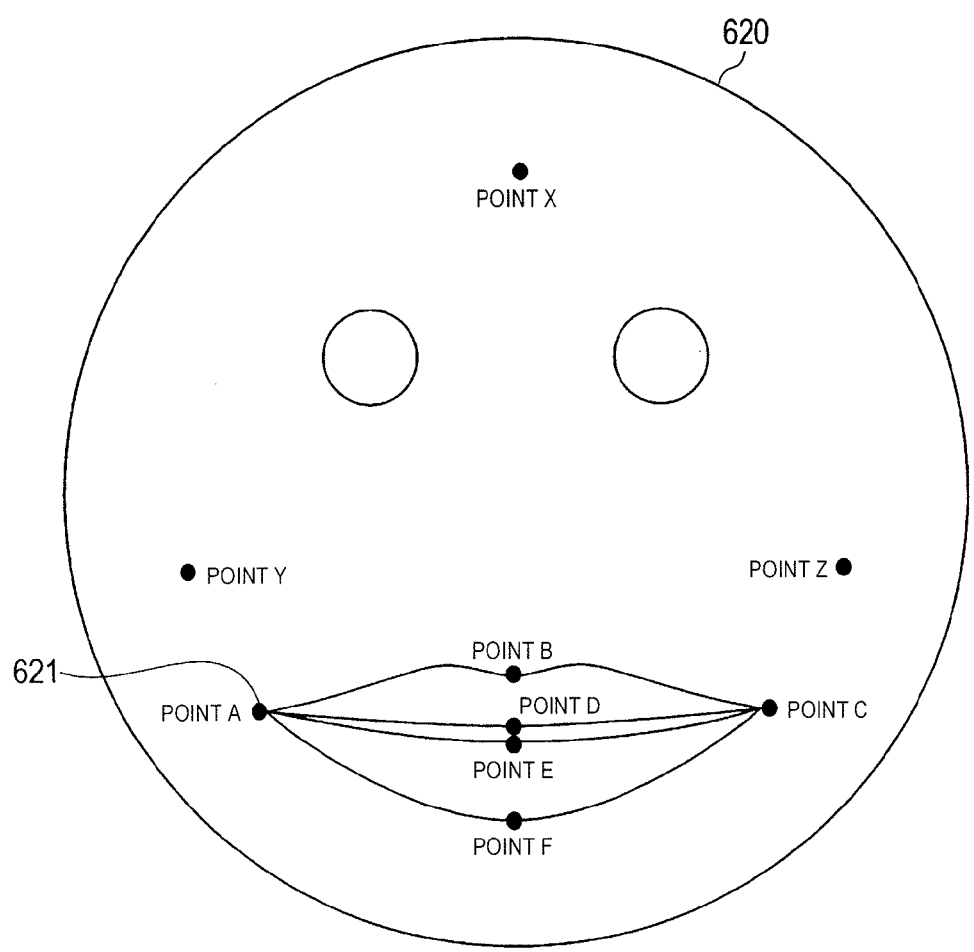
FIG. 24 is a diagram illustrating definition of a gesture according to the second exemplary embodiment.

FIG. 24 is a diagram illustrating definition of a gesture.

As illustrated in FIG. 24, a plurality of reference points (621) A to F and X to Z are defined on face 620. The positions of the reference points are decided using face feature points as references. One reference point or a plurality of reference points are defined in each of the target regions of make-up.

For example, information storage 510 in advance stores a gesture table describing a temporal change of a relative position relation between one reference point or a plurality of reference points and stylus 600 for each target region as a make-up operation on the target region.

For example, a make-up operation for an upper lip is a motion of stylus 600 (a gesture of user 700) of approaching stylus 600 to the reference points in the sequence of reference points A and B (or a central point of reference points B and D) and reference point C or its reverse sequence. Further, a make-up operation for a lower lip is a motion of stylus 600 of approaching stylus 600 to the reference points in the sequence of reference points A and F (or a central point of reference points F and E) and reference point C or its reverse sequence.

A make-up operation for a right cheek is a motion of stylus 600 of rotating stylus 600 near reference point Z several times. A make-up operation for foundation of an entire face is a motion of stylus 600 of approaching stylus 600 to the reference points in the sequence of reference points X, Y, and Z or its reverse sequence.

Make-up-image composer 550 determines whether the make-up operation is performed on each target region by comparing the temporal change of the position of stylus 600 detected from the video to content of each make-up operation described in the gesture table.

In contrast, image processing apparatus 500 may start composing the make-up image associated in advance with classification of stylus 600 with the imaged video on the condition that stylus 600 merely comes close to the face or stylus 600 is merely detected from the video.

In image processing apparatus 500, the content of the make-up image changed based on the classification of stylus 600 is not restricted to the above-described examples. That is, in the content of the make-up image described in make-up image table 510 (see FIG. 15), an image effect such as make-up gloss, a duration of the make-up image corresponding to durability of cosmetic, or the like may be different for each marker color (color disposition pattern).

Information storage 510 may access a predetermined server or the like on the Internet and acquire or update the content of make-up image table 510 (see FIG. 15). Information storage 510 acquires or updates the make-up image table periodically or at a timing instructed from the user or the server. Accordingly, image processing apparatus 500 can handle an increase or a change in stylus 600 flexibly and supply user 700 with virtual make-up to which make-up fashion is reflected.

When a pre-decided color is included as a color for wiping off the make-up in the video, stylus detector 540 may detect a portion of the color as an eraser stylus. Then, stylus detector 540 may end the composition of the make-up image on the condition that an operation of approaching the eraser stylus to a portion with which the make-up image is composed.

The concept of the make-up targeted by image processing apparatus 500 may include application of foundation on an entire face, drawing on a face, wearing of glasses, mounting of a color contact lens, and dying of an eyebrow or hair. In any case, the stylus is preferably a stylus resembling a tool used for a corresponding operation, such as a glasses-type plate or a brush type tool.

The apparatus to which image processing apparatus 500 is applied is not limited to the above-described example. Image processing apparatus 500 may be applied to, for example, a smartphone (image processing apparatus 100 described in the first exemplary embodiment), a tablet terminal, a personal computer, or a digital still camera.

For example, a part of the configuration of image processing apparatus 500 may be disposed in a server or the like on a network to be distant from the other parts of the configuration of image processing apparatus 500. In this case, each of these parts necessarily includes a communication unit to perform mutual communication.

The various exemplary embodiments have been described above with reference to the drawings, but it is not necessary to mention that the invention is not limited to these examples. It should be apparent to those skilled in the art that various modification examples or correction examples can be made within the scope of the invention described in the claims and it is construed that the modification examples and the correction examples, of course, pertain to the technical scope of the invention.

The present disclosure is useful for an image processing apparatus, a stylus, and an image processing method capable of performing a virtual make-up operation while performing self-imaging.

What is claimed is:

1. An image processing apparatus comprising:
   an imager that images a video;
   a display that displays the imaged video on a screen;
   a face-position acquirer that acquires a position of a face included in the video on the screen;
   an operation receiver that receives an operation on the screen; and
   a make-up-image composer that composes a make-up image with a part of the face of the video,
   wherein the operation receiver receives a touch operation on the screen, and
   the make-up-image composer changes a composition state of the make-up image when a swipe operation is performed in a predetermined direction directed towards the position of the face, the swipe operation being distinct from a drag operation.

2. The image processing apparatus according to claim 1, wherein the make-up-image composer changes the composition state of the make-up image when a distance between the position of the face and a position at which the swipe operation is performed in the direction directed towards the position of the face on the screen is equal to or less than a predetermined threshold value.

3. The image processing apparatus according to claim 1, wherein when a plurality of faces are included in the screen and when the swipe operation is performed in directions directed towards positions of the plurality of faces, the make-up-image composer sets the face, of the plurality of faces included in the screen, in which a distance to a position, at which the swipe operation is performed, is shortest, as a target of the change of composition state of the make-up image.

4. The image processing apparatus according to claim 1, wherein based on a direction difference between a swipe direction of the swipe operation on the screen and a direction of the face with respect to a position at which the swipe operation is performed and a distance between the position at which the swipe operation is performed and the position of the face, the make-up-image composer decides whether to set the face as a target of the change of composition state of the make-up image.

5. The image processing apparatus according to claim 1, wherein the make-up-image composer does not compose the make-up image with a part of the face in an initial state, starts composing the make-up image when the swipe operation is performed in the direction directed towards the position of the face with which the make-up image is not composed, changes the composed make-up image to a first make-up image different from the make-up image when the swipe operation is performed in a first direction directed towards the position of the face with which the make-up image is composed, and changes the composed make-up image to a second make-up image different from the make-up image when the swipe operation is performed in a second direction, that is different than the first direction.

6. The image processing apparatus according to claim 5, wherein the first make-up image has a different make-up depth than the composed make-up image and the second make-up image has a different make-up pattern than the composed make-up image.

7. The image processing apparatus according to claim 6, wherein the second direction is at least one of up and down directions.

8. The image processing apparatus according to claim 7, wherein the make-up-image composer determines whether the swipe operation is performed in the direction directed towards the position of the face, using the position of the face at the time at which the swipe operation is started, as the reference.

9. The image processing apparatus according to claim 1, wherein the make-up-image composer decides a target of a touch operation using a position of the face at the time at which the touch operation is started, as a reference.

10. The image processing apparatus according to claim 1, wherein the face-position acquirer tracks the position for each face in the video, and
wherein the make-up-image composer applies a make-up setting of the face for which the tracking of the position previously ends to the face for which the tracking of the position starts.

11. The image processing apparatus according to claim 1, wherein the face-position acquirer tracks the position for each face in the video, and
wherein the make-up-image composer acquires a relative positional relationship among a plurality of faces when the plurality of faces are included in the screen, and determines whether the make-up setting of the face for each face is maintained based on whether the tracking of the position continues and whether the relative positional relationship is maintained.

12. The image processing apparatus according to claim 11,
wherein when there are a first face for which the tracking of the position continues, a second face for which the tracking of the position ends, and a third face for which the tracking of the position starts after an end of the tracking of the position of the second face, the make-up-image composer applies the make-up setting of the second face to the third face when a relative position of the second face with respect to the first face is identical to a relative position of the third face with respect to the first face.

13. The image processing apparatus according to claim 11, wherein the relative positional relationship is a relative positional relationship using a vertical direction as a reference.

14. The image processing apparatus according to claim 1, wherein the swipe operation is performed without moving an image on the screen towards the face.

15. An image processing apparatus comprising:
an imager that images a video;
a display that displays the imaged video on a screen;
a face-position acquirer that acquires a position of a face included in the video on the screen;
an operation receiver that receives an operation on the screen;
a make-up-image composer that composes a make-up image with a part of the face of the video,
a stylus detector that detects a portion of a predetermined marker color of a stylus from the video when the portion of the predetermined marker color is included in the video; and
a make-up-image composer that composes a make-up image associated in advance with the predetermined marker color with a part of the face of the video when the stylus is detected.

16. The image processing apparatus according to claim 15,
wherein the stylus detector acquires a position of the stylus and determines whether a make-up operation of approaching the stylus to the face is performed by the user based on the acquired position of the face and the position of the stylus, and
wherein the make-up-image composer composes the make-up image when the make-up operation is performed.

17. The image processing apparatus according to claim 15,
wherein the make-up image is an image indicating a make-up state at a time at which make-up is applied to a region decided in advance using a face feature point as a reference,
wherein the face-position acquirer acquires a position of the face feature point of the face, and
wherein the make-up-image composer composes the make-up image when a make-up operation of approaching the stylus to the region is performed based on the acquired position of the face feature point and a position of the stylus.

18. The image processing apparatus according to claim 15,
wherein the stylus detector detects a portion of the predetermined marker color from the video, detects a position of the stylus based on the detected portion, and tracks the detected position of the stylus in the video.

19. The image processing apparatus according to claim 15,
wherein the stylus detector detects a color other than a color of the face included in a periphery region as an application-designated color from the periphery region of the detected portion of the predetermined marker color in the video, and
wherein the make-up-image composer generates the make-up image with a color approximate to the detected application-designated color.

20. The image processing apparatus according to claim 15,
wherein the make-up-image composer decides the make-up image to be composed with reference to a make-up information table describing content of the make-up image for each predetermined marker color in a plurality of the predetermined marker colors in advance, and
wherein in the content of the make-up image described in the make-up information table, at least one of a color, depth, and a region of the make-up image is different for each predetermined marker color.

21. The image processing apparatus according to claim 15,
wherein the predetermined marker color is a predetermined color disposition pattern formed by a plurality of predetermined colors.

22. A stylus that is used in the image processing apparatus according to claim 15 and is a bar-shaped member,
wherein the predetermined marker color is applied to a region including a front end portion of the bar-shaped member.

23. An image processing method comprising:
imaging a video;
displaying the imaged video on a screen;
acquiring a position of a face included in the video on the screen;
receiving an operation on the screen, the operation being a touch operation and
composing a make-up image with a part of the face in the video, by changing a composition state of the make-up image, when a swipe operation is performed in a direction directed towards a position of the face, the swipe operation being distinct from a drag operation.

24. The image processing method according to claim 23, wherein the swipe operation is performed without moving an image on the screen towards the face.

25. An image processing method comprising:
imaging a video;
displaying the imaged video on a screen;
acquiring a position of a face included in the video on the screen; and
receiving an operation on the screen, and
composing a make-up image with a part of the face in the video,
detecting a portion of a predetermined marker color of a stylus from the video when the portion of the predetermined marker color is included in the video; and
composing a make-up image associated in advance with the predetermined marker color with a part of the face in the video when the stylus is detected.

* * * * *